(12) United States Patent
Trajkovic et al.

(10) Patent No.: US 11,381,312 B2
(45) Date of Patent: *Jul. 5, 2022

(54) REDUNDANCY IN A PUBLIC SAFETY DISTRIBUTED ANTENNA SYSTEM

(71) Applicant: DALI WIRELESS, INC., Menlo Park, CA (US)

(72) Inventors: Sasa Trajkovic, Burnaby (CA); Andrew Leung, Burnaby (CA)

(73) Assignee: Dali Systems Co. Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/328,914

(22) Filed: May 24, 2021

(65) Prior Publication Data

US 2021/0351846 A1 Nov. 11, 2021

Related U.S. Application Data

(63) Continuation of application No. 16/861,561, filed on Apr. 29, 2020, now Pat. No. 11,018,769, which is a
(Continued)

(51) Int. Cl.
*H04B 10/2575* (2013.01)
*H04B 17/24* (2015.01)
(Continued)

(52) U.S. Cl.
CPC ....... *H04B 10/25753* (2013.01); *H04B 17/00* (2013.01); *H04B 17/24* (2015.01);
(Continued)

(58) Field of Classification Search
None
See application file for complete search history.

(56) References Cited

U.S. PATENT DOCUMENTS

| 4,980,681 A | 12/1990 | Noel |
|---|---|---|
| 10,644,798 B2 | 5/2020 | Trajkovic et al. |

(Continued)

FOREIGN PATENT DOCUMENTS

| CN | 103999436 A | 8/2014 |
|---|---|---|
| CN | 104081795 A | 10/2014 |

(Continued)

OTHER PUBLICATIONS

Hejazi et al., "A Self-Organized Network for Load Balancing Using Intelligent Distributed Antenna System Un reseau auto-organise pour l'equilibrage de charge utilisant un systeme intelligent d'antennes distribuees", Canadian Journal of Electrical and Computer Engineering, vol. 38, No. 2, Apr. 2015, pp. 89-99.

*Primary Examiner* — Darren E Wolf
(74) *Attorney, Agent, or Firm* — Artegis Law Group, LLP

(57) ABSTRACT

A redundancy system for data transport in a Distributed Antenna System (DAS) includes a plurality of Digital Access Units (DAUs). Each of the plurality of DAUs is fed by a plurality of data streams and is operable to transport digital signals between others of the plurality of DAUs. The redundancy system also includes a plurality of Digital Distribution Units (DDUs). Each of the plurality of DDUs is in communication with each of the plurality of DAUs using cross connection communication paths. The redundancy system further includes a plurality of Digital Remote Units (DRUs). Each of the plurality of DRUs is in communication with each of the plurality of DDUs using cross connection communications paths.

17 Claims, 25 Drawing Sheets

Related U.S. Application Data continuation of application No. 15/594,323, filed on May 12, 2017, now Pat. No. 10,644,798.

(60) Provisional application No. 62/335,383, filed on May 12, 2016.

(51) Int. Cl.
    *H04B 17/00*     (2015.01)
    *H04B 17/30*     (2015.01)
    *H04J 14/02*     (2006.01)
    *H04Q 11/00*     (2006.01)
    *H04W 88/08*     (2009.01)
    *H04W 24/04*     (2009.01)
    *H04B 17/382*     (2015.01)
    *H04W 16/32*     (2009.01)

(52) U.S. Cl.
    CPC ........... *H04B 17/30* (2015.01); *H04B 17/382* (2015.01); *H04J 14/0278* (2013.01); *H04Q 11/0067* (2013.01); *H04W 88/085* (2013.01); *H04Q 2011/0016* (2013.01); *H04W 16/32* (2013.01); *H04W 24/04* (2013.01)

(56) References Cited

U.S. PATENT DOCUMENTS

| | | |
|---|---|---|
| 2006/0094470 A1 | 5/2006 | Wake et al. |
| 2008/0181171 A1 | 7/2008 | Koziy et al. |
| 2010/0093391 A1 | 4/2010 | Saban et al. |
| 2012/0039254 A1 | 2/2012 | Stapleton et al. |
| 2013/0337750 A1 | 12/2013 | Ko |
| 2014/0072299 A1 | 3/2014 | Stapleton et al. |
| 2014/0162713 A1 | 6/2014 | Stapleton et al. |
| 2014/0169264 A1 | 6/2014 | Katori |
| 2014/0242999 A1 | 8/2014 | Goshen et al. |
| 2015/0256358 A1 | 9/2015 | Stapleton et al. |
| 2016/0242044 A1 | 8/2016 | Han et al. |

FOREIGN PATENT DOCUMENTS

| | | |
|---|---|---|
| CN | 104221293 A | 12/2014 |
| JP | 2013-541875 A | 11/2013 |
| JP | 2014-121054 A | 6/2014 |
| WO | 2006/135697 A1 | 12/2006 |
| WO | 2012/024345 A2 | 2/2012 |
| WO | 2012/024349 A1 | 2/2012 |

REDUNDANCY IN A PUBLIC SAFETY DISTRIBUTED ANTENNA SYSTEM

CROSS-REFERENCES TO RELATED APPLICATIONS

This application is a continuation of the co-pending U.S. patent application titled, "REDUNDANCY IN A PUBLIC SAFETY DISTRIBUTED ANTENNA SYSTEM," filed on Apr. 29, 2020 and having Ser. No. 16/861,561, which is a continuation of the U.S. patent application titled, "REDUNDANCY IN A PUBLIC SAFETY DISTRIBUTED ANTENNA SYSTEM," filed on May 12, 2017 and having Ser. No. 15/594,323, issued as U.S. Pat. No. 10,644,798, which claims the priority benefit of the U.S. provisional patent application titled, "Redundancy in a Public Safety Distributed Antenna System," filed on May 12, 2016 and having Ser. No. 62/335,383. The subject matter of these related applications is hereby incorporated herein by reference.

BACKGROUND OF THE INVENTION

Public Safety communication systems employing Distributed Antenna Systems (DAS) are available. Public Safety has stringent requirements on system reliability and redundancy. A DAS typically includes one or more host units, optical fiber or other suitable transport infrastructure, and multiple remote antenna units. A radio base station is often employed at the host unit location commonly known as a base station hotel, and the DAS provides a means for distribution of the base station's downlink and uplink signals among multiple remote antenna units. The DAS architecture with routing of signals to and from remote antenna units can be either fixed or reconfigurable.

A DAS is advantageous from a signal strength and throughput perspective because its remote antenna units are physically close to wireless subscribers. The benefits of a DAS include reducing average downlink transmit power and reducing average uplink transmit power, as well as enhancing quality of service and data throughput.

Despite the progress made in public safety communications systems, a need exists for improved methods and systems related to public safety communications.

SUMMARY OF THE INVENTION

The present invention generally relates to public safety communication systems employing Distributed Antenna Systems (DAS) as part of a distributed wireless network. More specifically, the present invention relates to a DAS utilizing a software configurable network. In a particular embodiment, the present invention has been applied to the use of cross-coupled connections amongst Digital Host Units, Digital Distributed Units and Digital Remote Radios. The methods and systems described herein are applicable to a variety of communications systems including systems utilizing various communications standards. Utilizing embodiments of the present invention, fully redundant, self-monitoring, self-healing digital DAS are provided.

Public Safety network operators face the continuing challenge of building reliable networks. Mobility and an increased level of multimedia content for end users typically employs end-to-end network adaptations that support new services and the increased demand for broadband Internet access. One of the most difficult challenges faced by Public Safety networks is the ability to have 99.999% service availability throughout the network. Fire-fighters, Police, Homeland Security, etc. all need guaranteed communications in the event of a disaster. A high service availability system requires full redundancy of all elements/components on the communication path.

According to an embodiment of the present invention, a system for data transport in a Distributed Antenna System is provided. The system includes a plurality of DAUs (Digital Access Units also referred to as Hosts) which are connected to one or more BTSs (Base Transceiver Station). In another embodiment, the BTSs can be replaced with off-air signals. The off-air signals could originate from BTSs wirelessly communicating with the DAUs or via repeaters which capture a remote signal from a BTS. The plurality of DAUs are coupled to each other and operable to transport signals between the plurality of DAUs. The system also includes a plurality of DDUs (Digital Distribution Units). Each of the plurality of DDUs are in communication with one or more of the DAUs using an optical communications path. The system further includes a plurality of transmit/receive cells. Each of the plurality of transmit/receive cells includes a plurality of DRUs (Digital Remote Units also referred to as Remote Units). Each of the DRUs in one of the plurality of transmit/receive cells is in communication with one or more of the plurality of DDUs using an optical communications path (e.g., an optical fiber, which is also referred to as an optical cable and is operable to support both digital and analog signals (i.e., RF over fiber)).

According to another embodiment of the present invention, a system for routing signals in a Distributed Antenna System (DAS) is provided. The system includes a plurality of Base Transceiver Stations (BTS), each having one or more sectors and a plurality of BTS RF connections, or Digital connections each being coupled to one of the one or more sectors. The system also includes a plurality of local Digital Distribution Units (DDUs) located at a Local location. Each of the plurality of local DDUs is operable to route signals between the plurality of local DAUs, and coupled to at least one of the plurality of remote DRUs. The system further includes a plurality of remote DDUs located at a Remote location. The plurality of remote DDUs are operable to transport signals between the plurality of remote DRUs. The plurality of local DDUs can be coupled via at least one of Ethernet cable, Optical Fiber, Microwave Line of Sight Link, Wireless Link, or Satellite Link.

The plurality of local DAUs can be connected to the plurality of remote DDUs via at least one DWDM or CWDM signal and at least one optical fiber. Similarly, the plurality of remote DDUs can be connected to the plurality of remote DRUs via at least one DWDM or CWDM signal and at least one optical fiber. The plurality of remote DDUs can be coupled via at least one of Ethernet cable, Optical Fiber, Microwave Line of Sight Link, Wireless Link, or Satellite Link. In an embodiment, the plurality of remote DDUs include one or more optical interfaces. As an example, the one or more optical interfaces can include an optical input and an optical output. In some embodiments, the system also includes a server coupled to each of the plurality of remote DDUs. A single DAU port is connected to a plurality of BTSs in some implementations.

According to another embodiment of the present invention, a system for routing signals in a DAS is provided. The system includes a plurality of local Digital Access Units (DAUs) located at a Local location. The plurality of local DAUs are coupled to each other and operable to route signals between the plurality of local DAUs. The system also includes a plurality of remote Digital Access Units (DAUs) located at a Remote location coupled to each other and operable to transport signals between the remote DAUs and each other and a plurality of Base Transceiver Stations (BTS). The system further includes a plurality of Base Transceiver Station sector RF connections coupled to the plurality of local DAUs and operable to route signals between the plurality of local DAUs and the plurality of Base Transceiver Stations sector RF connections and a plurality of DRUs connected to a plurality of remote DAUs via at least one of a Ethernet cable, Optical Fiber, RF Cable, Microwave Line of Sight Link, Wireless Link, or Satellite Link.

According to another embodiment of the present invention, a Public Safety system for data transport in a Distributed Antenna System (DAS) includes a plurality of Digital Access Units (DAUs), Digital Distribution Units (DDUs) and Digital Remote Units (DRUs). The plurality of DAUs are coupled to each other and operable to transport digital signals between the plurality of remote DAUs. The system also includes a plurality of Digital Distribution Units. Each of the plurality of DDUs is in communication with a plurality of DAUs using an electrical communications path. The system further includes a plurality of transmit/receive cells. Each of the plurality of transmit/receive cells includes a plurality of DRUs. Each of the DRUs in one of the plurality of transmit/receive cells is in communication with one of the plurality of DDUs using an optical communications path. Redundancy of the Public Safety system is achieve by cross connecting the optical fibers amongst the plurality of DAU, DDU and DRUs.

Numerous benefits are achieved by way of the present invention over conventional techniques. For instance, embodiments enable the routing redundancy at the remote location. Additionally, embodiments provide for redundancy in the context of DAS-based architectures for public safety communication systems. These and other embodiments of the invention along with many of its advantages and features are described in more detail in conjunction with the text below and attached figures.

DETAILED DESCRIPTION OF SPECIFIC EMBODIMENTS

A distributed antenna system (DAS) provides an efficient means of utilization of base station resources. The base station or base stations associated with a DAS can be located in a central location and/or facility commonly known as a base station hotel. The DAS network comprises one or more digital access units (DAUs) that function as the interface between the base stations, the digital distribution units (DDUs) and the digital remote units (DRUs). The DAUs can be collocated with the base stations. The DRUs can be daisy chained together and/or placed in a star configuration and provide coverage for a given geographical area. The DRUs are typically connected via the DDUs to the DAUs by employing a high-speed optical fiber link. This approach facilitates transport of the RF signals from the base stations to a remote location or area served by the DRUs.

Figure 1:
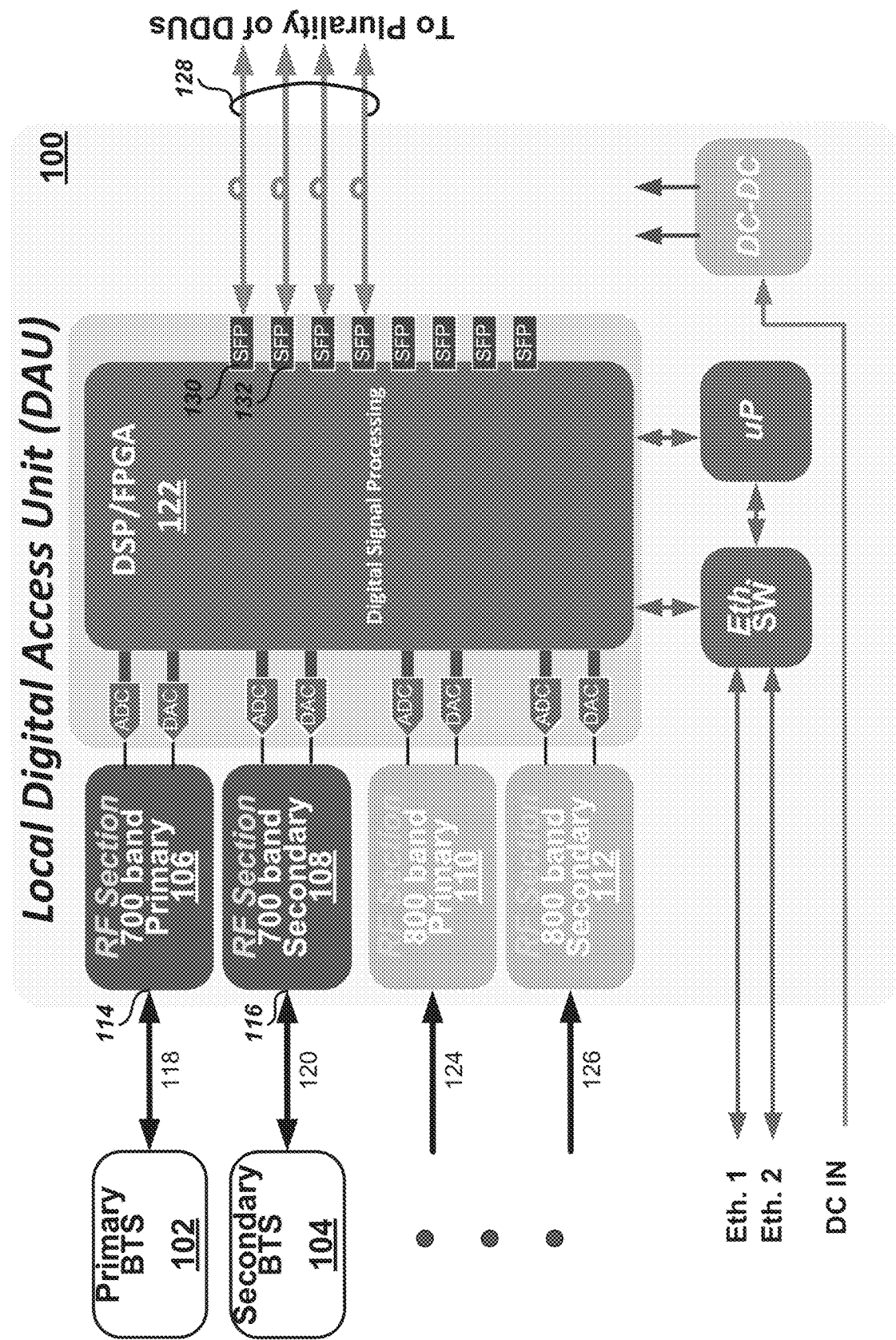
FIG. 1 is a block diagram illustrating the basic structure of a digital access unit (DAU) according to an embodiment of the present invention.

FIG. 1 is a block diagram illustrating the basic structure of a local digital access unit (DAU) 100 according to an embodiment of the present invention. In this embodiment, two BTSs are connected to a local DAU 100 via a primary port 114 and a secondary port 116 for each band. In some embodiments, the primary port 114 and the secondary port 116 can be a first RF input port and a second RF input port respectively. The local DAU 100 encompasses primary and secondary RF section per band that provide primary and secondary interface. The optical output feeds a plurality of DDUs. If the primary feed 118 or secondary feed 120 is off-air, then an RF section with a duplexer along with a power amplifier for the Rx path to the remote BTS and a low noise amplifier for the Tx path from the remote BTS, and multi-channel, digital, agile band-pass filters with adjustable pass bandwidth is applied for that feed as described in additional detail in relation to FIG. 3.

Figure 2:
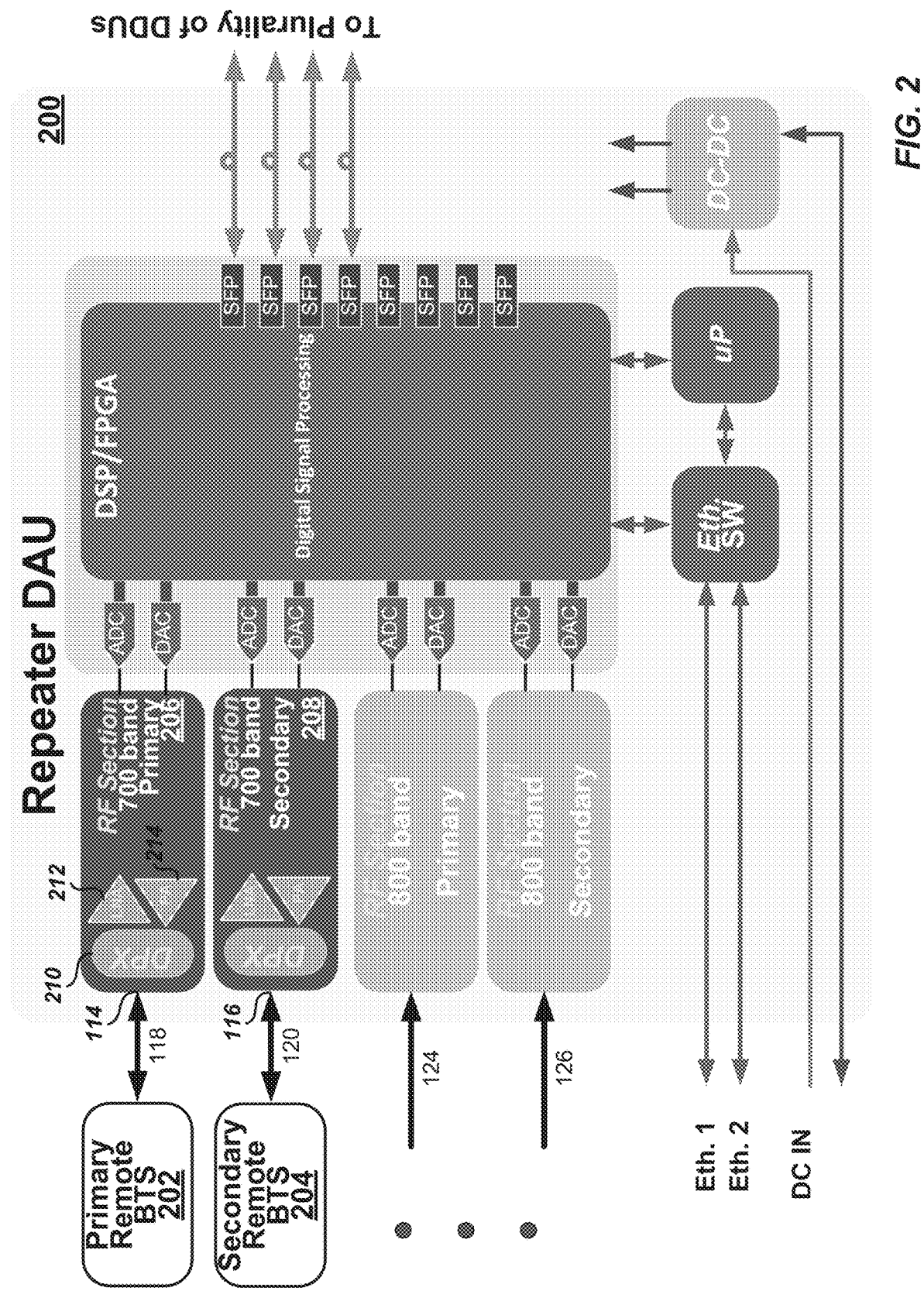
FIG. 2 is a block diagram according to one embodiment of the invention showing the basic structure of a DAU with an integrated repeater functionality on the primary and secondary inputs.

FIG. 1 depicts a local DAU 100, also referred to as a host or host unit. In accordance with an embodiment of the present invention, each DAU is fed from a Primary BTS 102 and a Secondary BTS 104 or, as illustrated in FIG. 2, an off-air signal. An off-air signal references a wireless signal from a remote BTS. As an example of an off-air signal, a Primary BTS 102 could be located in the same building as the DAU, providing the primary feed 118. A Secondary BTS 104 could be located remotely, for example, several miles away from the DAU, to provide for redundancy. In this example, the Secondary BTS 104 would provide the secondary feed. If the BTS that provides the primary feed fails, then the local DAU 100 will switch to the secondary feed 120 as described more fully below. In another implementation, two BTSs could be collocated with the local DAU 100, with one of the BTSs operating in hot standby mode. Similar use of off-air pickups can be implemented as discussed below.

The BTS or off-air signal is coupled to the local DAU 100 via an RF connection or a digital connection. The local DAU 100 communicates with a plurality of Digital Distribution Units (DDUs) via an optical feed 130. As illustrated in FIG. 1, the local DAU 100 can accommodate multiple frequency bands. In some embodiments, one primary RF section may be used for each frequency band.

In the embodiment illustrated in FIG. 1, the local DAU 100 includes dual RF sections: a primary RF section 106 at the 700 MHz band and a secondary RF section 108 at the 700 MHz band. These dual RF sections are utilized to receive dual inputs illustrated as the primary feed 118 and secondary feed 120. Thus, the multi-level system redundancy provided by embodiments of the present invention includes redundancy provided by redundant RF sections in each of the DAUs.

In some cellular systems, the local DAU 100 would receive multiple bands as appropriate for a cellular system, for example, one or more of 150 MHz, 450 MHz, 700 MHz, 800 MHz, 900 MHz, etc. In some Public Safety (PS) implementations, a single band is utilized, whereas in other PS implementations, multiple bands are utilized. As an example, FIG. 1 illustrates an optional primary RF section 110 at the 800 MHz band and an optional secondary RF section 112 at the 800 MHz band. Thus, the illustrated local DAU 100 includes dual RF sections per band. Primary and secondary feeds will be provided to the optional band(s) as appropriate.

The particular bands illustrated in FIG. 1 are not intended to limit the present invention but to provide exemplary bands that can be utilized according to embodiments of the present invention. In this embodiment, one of the primary RF sections is designated as a primary and the other primary RF section is designated as a secondary. Although primary and secondary RF sections are illustrated in FIG. 1, the present invention is not limited to this implementation and a tertiary RF section can be utilized, as well as additional RF sections if the number of redundant sections is greater than three. One of ordinary skill in the art would recognize many variations, modifications, and alternatives.

Figure 6:
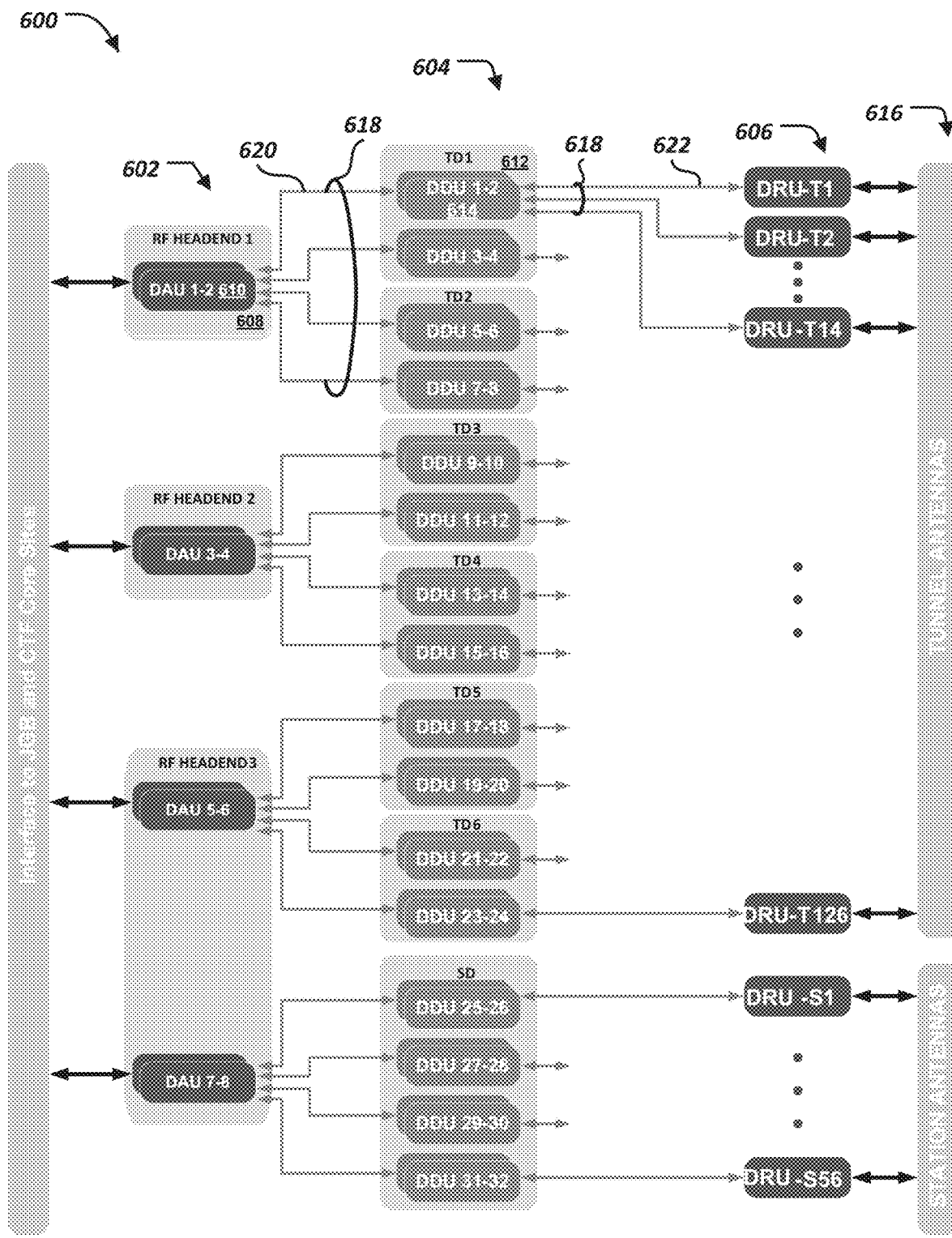
FIG. 6 is a block diagram illustrating the public safety system architecture that ensures redundancy in the network according to an embodiment of the present invention.

In an embodiment in which multiple bands are utilized, e.g., both 700 MHz and 800 MHz bands, the feeds at these bands can be combined in a DSP unit 122. In some embodiments the DSP unit 122 can be a field programmable gate array (FPGA) configured with digital signal processing logic. The DSP unit 122 can provide a combined digital data stream that is output by the local DAU 100, broadcast to the DDUs 602, and then broadcast to the DRUs 604 as illustrated in FIG. 6. As an example, the primary feed 118 at 700 MHz could be combined with the secondary feed 126 at 800 MHz if the primary RF section 110 at 800 MHz has failed.

One feature of embodiments of the present invention is the ability to route Base Station radio resources among the DAUs or group(s) of DAUs. In order to route radio resources available from one or more Base Stations, it is desirable to configure the individual router tables of the DAUs in the DAS network. This functionality is provided by embodiments of the present invention.

Figure 7:
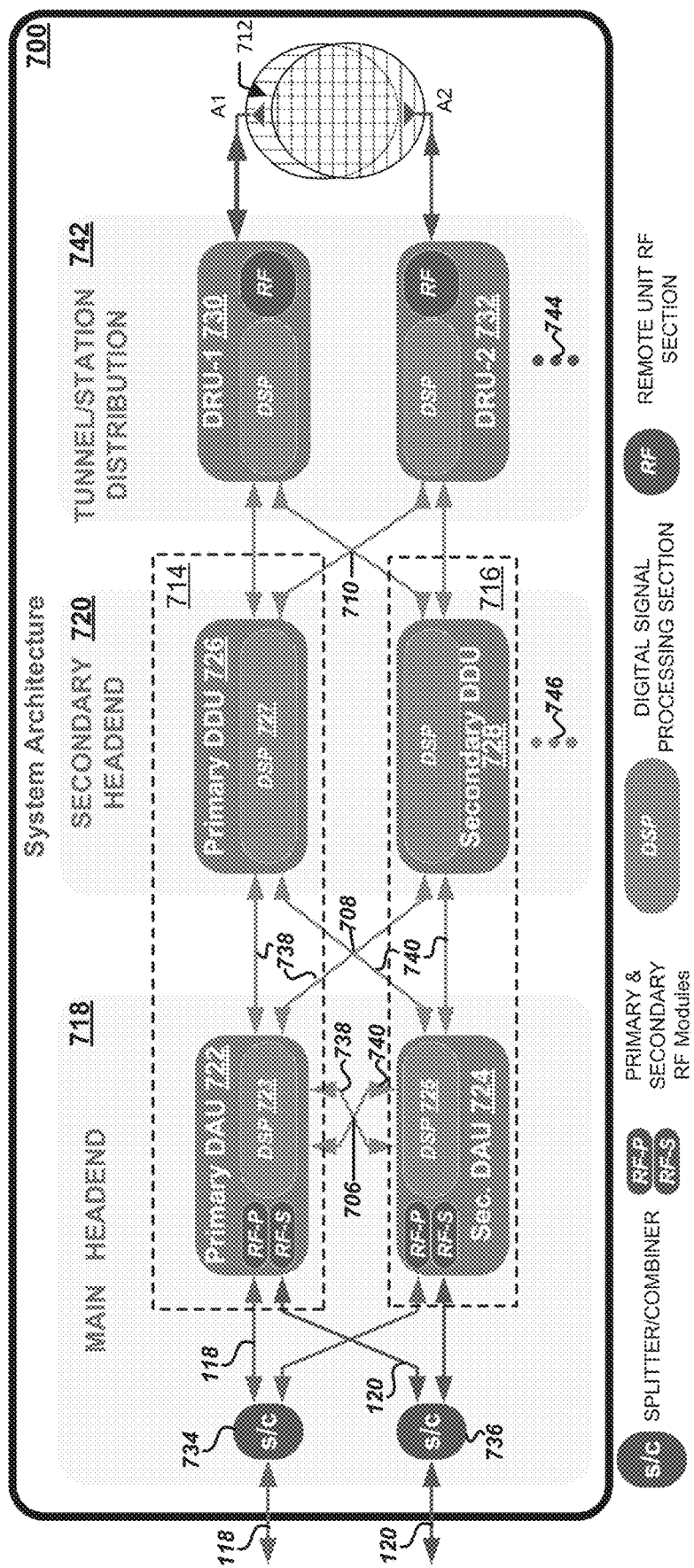
FIG. 7 is a block diagram according to one embodiment of the invention showing the basic structure of a full redundancy Public Safety Digital DAS architecture.

The DAUs are networked together as illustrated in FIG. 7 to facilitate the routing of signals among multiple DAUs. The DAUs support the transport of the RF downlink and RF uplink signals between the Base Station and the various DAUs. This architecture enables the various Base Station signals to be transported simultaneously to and from multiple DAUs. PEER ports are used for interconnecting DAUs in some embodiments.

The DAUs have the capability to control the gain (in small increments over a wide range) of the downlink and uplink signals that are transported between the DAU and the base station (or base stations) connected to that DAU. This capability provides flexibility to simultaneously control the uplink and downlink connectivity of the path between a particular Remote DAU (or a group of DAUs) and a particular base station sector.

The digital data streams 128 output by the local DAU 100 to the plurality of DDUs are the same data stream in some embodiments. These digital data streams 128 enable the content to be provided to multiple DDUs for subsequent distribution to DRUs. The digital data streams 128 output by the local DAU 100 can be the digital data stream based on the primary feed 118 or the digital data stream based on the secondary feed 120. The digital data stream can be output from the local DAU using at least a first digital optical output port 130 connected to a primary DDU and a second digital optical output port 132 connected to a secondary DDU.

In operation, both RF sections are operational. Both the primary feed 118 and the secondary feed 120 are processed inside the DSP logic 122 and two digital data streams are produced. The DSP unit 122 then decides which digital data stream will be utilized for transmission. The default setting can be transmission of the primary digital data stream. Additional description related to redundant operation is provided in relation to FIGS. 13-17.

FIG. 2 depicts a repeater Digital Access Unit (DAU) 200, also referred to as a host or host unit, which has an embedded repeater functionality. In this embodiment, two off-air feeds are connected to a repeater DAU 200 via a primary port 114 and secondary port 116 for each band. The DAU with an integrated repeater functionality encompasses a primary RF section 206 and a secondary RF section 208 per band that provide a primary and a secondary interface. The repeater function is provided by a duplexer 210 along with a power amplifier 214 for the Rx path to the primary remote BTS 202 and a low noise amplifier 212 for the Tx path from the remote BTS, and multi-channel, digital, agile band-pass filters with adjustable pass bandwidth. If the primary or secondary feed is from a collocated Base Station, then an RF section without a duplexer, power amplifier for the Rx path, and low noise amplifier for the Tx path is applied for that feed as described in additional detail in relation to FIG. 3.

In accordance with embodiments of the present invention, each repeater DAU 200 is fed from a Primary remote BTS 202 and a secondary Remote BTS 204. The BTS or off-air signal is coupled to the DAU via an RF connection or a digital connection. The repeater DAU 200 has an embedded duplexer 210, Low Noise Amplifier 212 and Power Amplifier 214. This facilitates the communication with remote BTSs or an off-air signal source over large distances in which signals are weaker than from collocated BTSs. If the mixed signal feeds are delivered to a DAU, local Base Station and off-air (remote Base Station), two types of RF sections are implemented.

Figure 3:
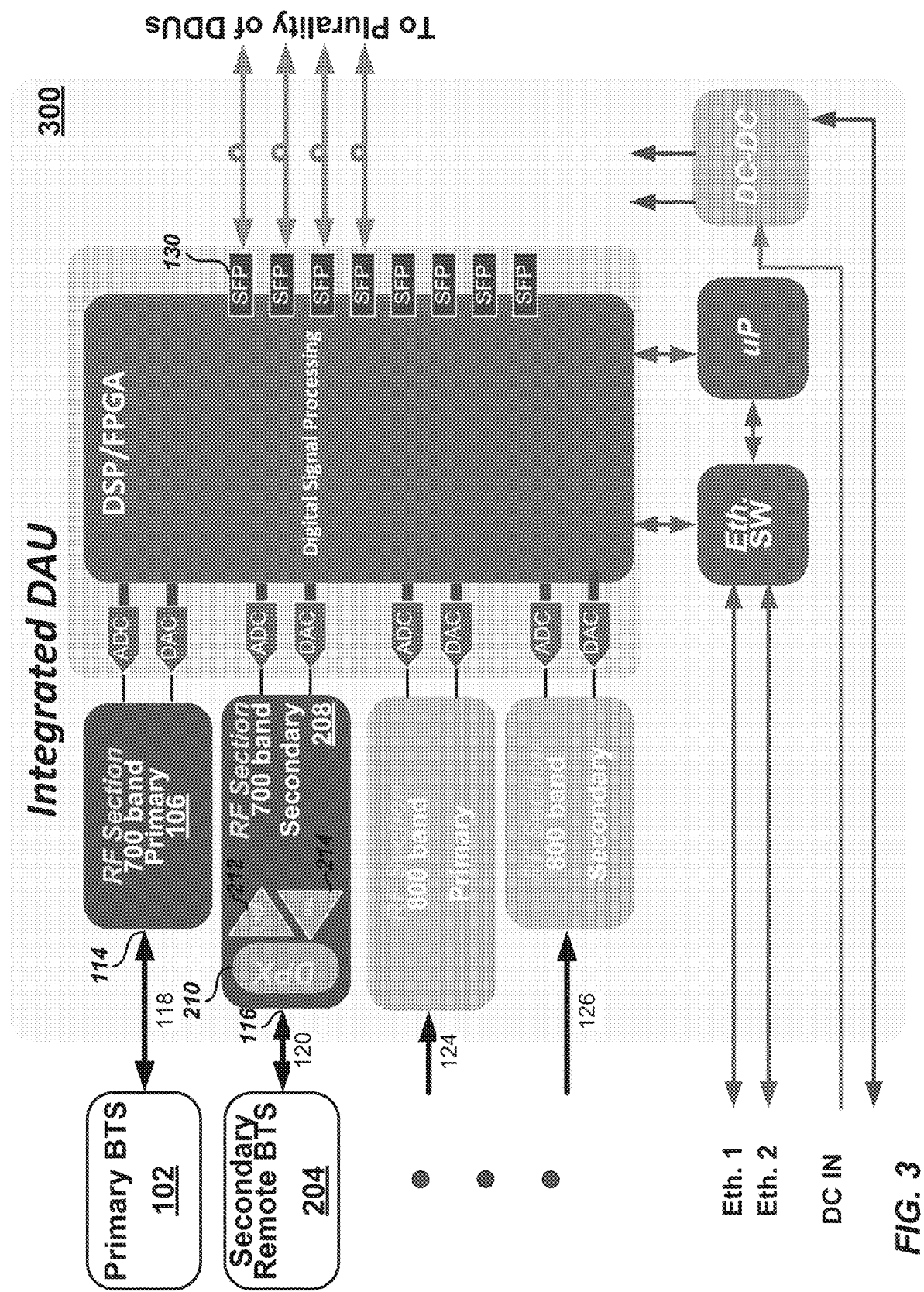
FIG. 3 is a block diagram according to one embodiment of the invention showing the basic structure of an integrated DAU with repeater functionality on one of the inputs.

FIG. 3 depicts a Digital Access Unit (DAU) 300, also referred to as a host or host unit, operable to receive mixed signals. In this embodiment, mixed signal feeds are delivered to a DAU—Primary Base Station 102 and off-air (remote Base Station) 204 feeds are connected to an integrated DAU 300 via a primary port 114 and secondary port 116 for each band. The integrated DAU 300 encompasses a primary RF section 106 and a secondary RF section 208 per band, that provide primary and secondary interfaces. The optical output 130 feeds a plurality of DDUs. For the remote BTS 204 feed RF section 208 with a duplexer 210 along with a power amplifier 214 for the Rx path to the remote BTS 204 and a low noise amplifier 212 for the Tx path from the remote BTS 204, and multi-channel, digital, agile band-pass filters with adjustable pass bandwidth is applied. For feed from a collocated Base Station 102 RF section 106 without a duplexer, power amplifier for the Rx path, and low noise amplifier for the Tx path is applied.

In this embodiment, for the off-air feed/secondary remote BTS 204, an RF section 208 with a duplexer 210, power amplifier 214, and low noise amplifier 212 is used, while for the feed from a collocated Base Station, an RF section 106 without a duplexer, power amplifier, and low noise amplifier is used. The integrated DAU 300 communicates with a plurality of Digital Distribution Units (DDUs) via an optical feed 130. As illustrated in FIG. 2, the repeater DAU 200 can accommodate multiple frequency bands. In some implementations, the repeater functionality can be provided separately, although this repeater functionality is illustrated as embedded in FIGS. 2 and 3.

Figure 4:
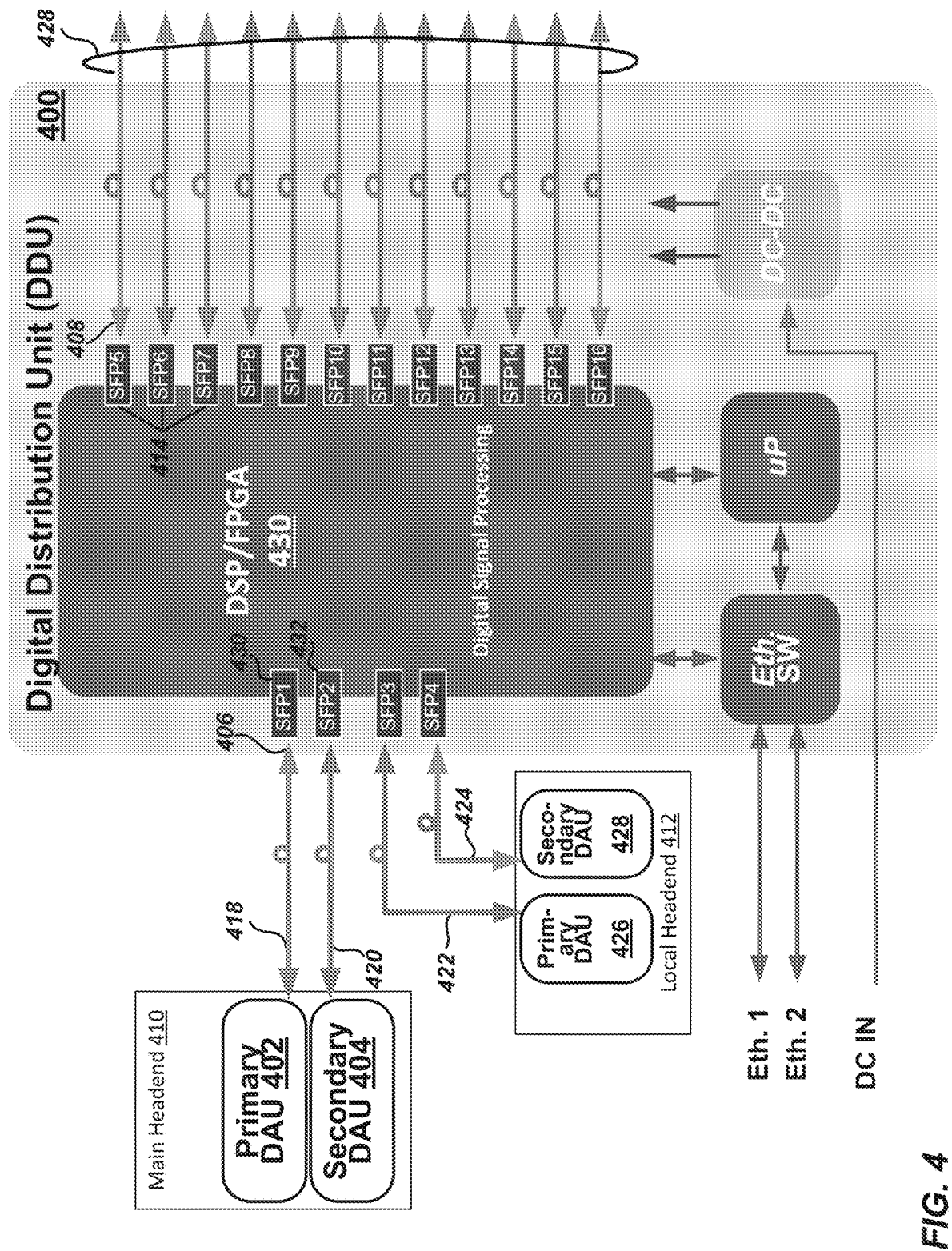
FIG. 4 is a block diagram according to one embodiment of the invention showing the basic structure of a digital distribution unit (DDU)

FIG. 4 depicts a Digital Distribution Unit (DDU) 400. The DDU 400 routes optical signals between the plurality of DAUs and a plurality of DRUs. In accordance with the present invention, each DDU 400 is fed from a Primary DAU 402 and Secondary DAU 404. The DDU 400 is coupled to the plurality of DAUs via optical connections 406. The DDU 400 communicates with a plurality of Digital Remote Units (DRUs) via an optical feed. As illustrated in FIG. 3, the DDU 400 can accommodate interfacing to multiple primary and secondary DAUs. The DDU 400 distributes the BTS or Off-air signals to a plurality of DRUs.

The DDU 400 receives the primary data stream 418 and the secondary data stream 420 from the redundant set of the primary DAU 402 and the secondary DAU 404 and redistributes signals based on either or both of the primary data stream 418 and the secondary data stream 420 to a network of DRUs. As illustrated in FIG. 4, the primary data stream 418 is received from a primary DAU 402 in the Main Headend 410. A first input port 430 is coupled to the first digital optical output port of the primary DAU 402. The secondary data stream 420 is received from a secondary DAU 404 in the Main Headend 412. A second input port 432 is coupled to the first digital optical output port of the secondary DAU 404.

As illustrated in FIG. 4, the DDU 400 provides a larger number of optical outputs 408 for delivery of data streams 428 to the DRUs than the number of data streams received at the DDU 400. This enables a system architecture in which a small number of DAUs and DDUs interoperate with a large number of DRUs. The DDU 400 receives the data stream from the DAU and redistributes the data stream to multiple DRUs. In some embodiments, the DDU 400 has 16 optical ports 414, with two utilized to receive the primary data stream 418 and the secondary data stream 420 and 14 utilized as output ports to provide data streams to the DRUs. At least a first output port and a second output port of the optical ports 414 are utilized to provide redundancy for the data streams to the DRUs. In other embodiments, including the embodiment illustrated in FIG. 4, two optical ports are utilized to receive the primary data stream 418 and the secondary data stream 420 from the Main Headend 410. Further, two optical ports are utilized to receive the Local Headend primary local data stream 422 and the Local Headend secondary local data stream 424 from the Local Headend, with 12 optical ports utilized to provide data streams 128 to the DRUs.

In the illustrated embodiment, the Local Headend 412 can represent a local municipality service that operates on the same or a different band than the entity represented by the Main Headend 410. The DAUs at the Local Headend 412 can provide additional data streams that can be received by the DDU 400, aggregated with the data stream received from the Main Headend 410, and delivered to the DRUs. As an example, the primary data stream 418 from the Main Headend and the primary data stream 422 from the Local Headend could be processed in a DSP unit 430. In some embodiments, the DSP unit 430 can be an FPGA configured with digital signal processing logic. The DSP unit 430 can generate a combined stream and the combined stream can be transmitted to the DRUs. In addition to distribution or rebroadcasting of a data stream from a small number of DAUs, or host units, to a larger number of DRUs, the DDU 400 can aggregate additional data streams locally at the location where it is positioned, thereby providing augmentation of services for a particular area.

Figure 5:
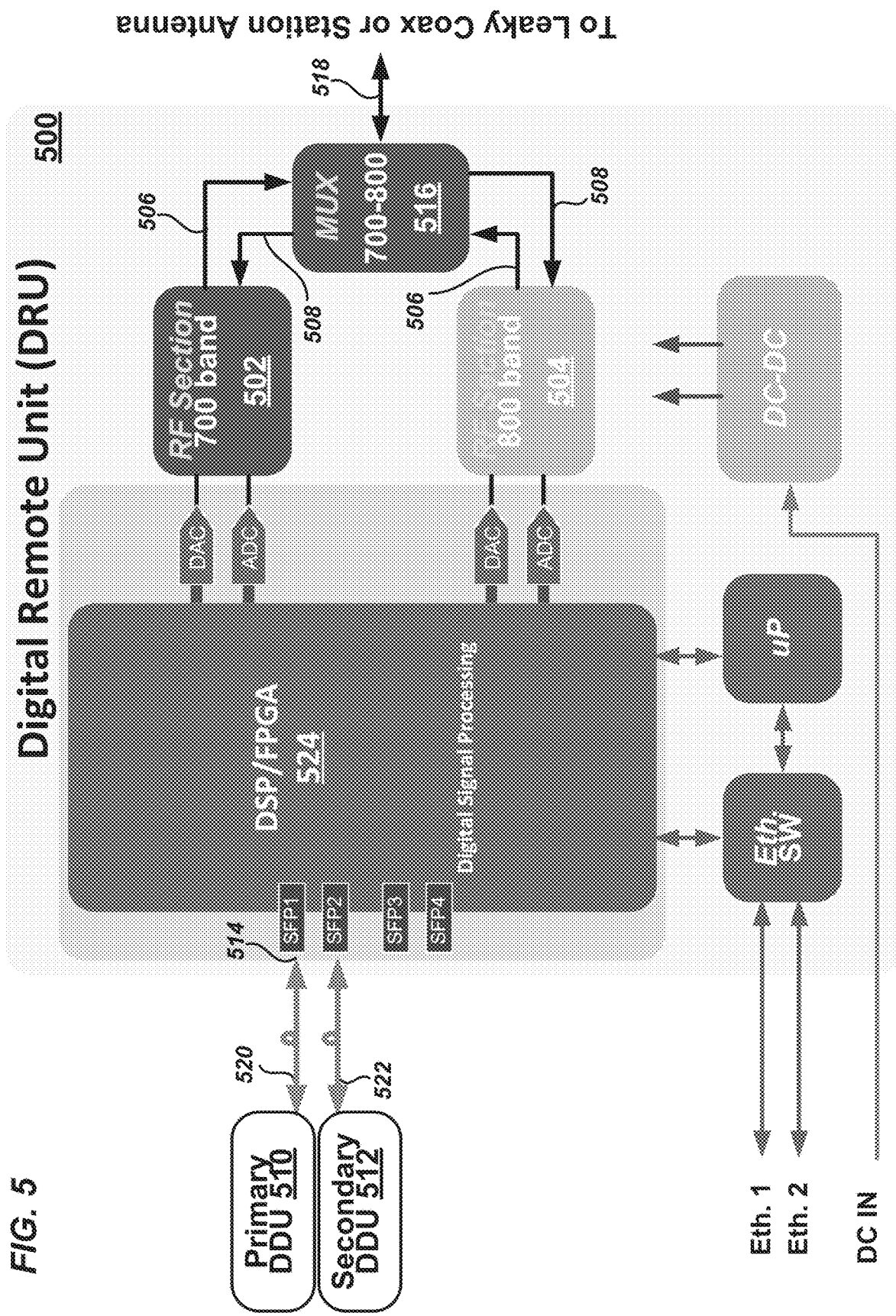
FIG. 5 is a block diagram illustrating a digital remote unit (DRU)

FIG. 5 depicts a Digital Remote Unit (DRU) 500 which contains a 700 MHz band RF section 502 and an 800 MHz band RF section 504 that deliver the BTS Tx signal 506 to the antenna and receives the User Rx signal 508 from the antenna, according to an embodiment of the present invention. The DRU 500 is interconnected with a plurality of DDUs. The DRU 500 translates the RF Rx signals to digital signals for transport to the BTS and translates the digital Tx signals from the BTS to RF signals for broadcasting over the antenna. In accordance with the present invention, each DRU 500 is fed from a Primary DDU 510 and a Secondary DDU 512. The DRU 500 is coupled to the plurality of DDUs via optical connections 514. As illustrated in FIG. 5, the DRU 500 can accommodate interfacing to multiple frequency band RF transceivers. The DRU 500 consists of a plurality of RF sections and a multiplexer 516 to facilitate interconnection 518 to a RF antenna.

The DRU 500 receives a primary data stream 520 and a secondary data stream 522 from the Primary DDU 510 and the Secondary DDU 512. In FIG. 6, for example, DDU-1 and DDU-3 in TD 1 612 provide the primary data stream 520 and the secondary data stream 522 to DRU-T1. A DSP unit 524 processes the received data streams to provide outputs to the RF section(s), which can be implemented at different bands as needed to provide the RF output for the leaky coaxial cable, for example, in a tunnel, or a station antenna, either directional or omnidirectional. In some embodiments, the DSP unit 524 can be an FPGA configured with digital signal processing logic.

FIG. 6 depicts one embodiment of a Public Safety system architecture 600. The plurality of DAUs 602 feed a plurality of DDUs 604 that in turn feed a plurality of DRUs 606 (which can also be referred to as remote units). In accordance with the present invention, a plurality of DAUs 602 are interconnected with a plurality of DDUs 604 that feed a plurality of DRUs 606. As illustrated in FIG. 6, at RF Headend 1 608 there is a collocated a primary and secondary DAUs 610. Similarly at TD 1 612 there is collocated a primary and secondary DDU 614. The primary and secondary DDUs feed a plurality of DRUs 606. The DRUs 606 are connected to antennas 616 that provide coverage to a fixed remote location.

The system illustrated in FIG. 6 includes 3 RF Headend sites, 6 Tunnel Distribution (TD) sites, and Station Distribution (SD) equipment. In this configuration, 126 DRUs for tunnels coverage and 56 DRUs for station coverage are utilized. It should be noted that TD and SD equipment can be integrated with Headend sites. As illustrated, the unit count is redundant DAUs: 8; Digital Distribution Units: 32; and DRUs: 182.

The 3 RF Headend sites are fed by different base station resources. Referring to RF Headend 1 608, a pair of redundant DAUs 610 are represented by Host-1 and Host-2. The pair of redundant DAUs 610 provides a data stream 618 to multiple, redundant DDUs 614, which are also arranged in pairs. Each pair of redundant DDUs 614 provides the data stream 618 to multiple DRUs. Thus, the single line between Host-1 and DDU-1 620 represents a set of four redundant lines connecting DAU-1 and DAU-2 to DDU-1 and DDU-2. The single line between DDU-1 and DDU-2 to DRU-T1 622 represents a set of two redundant lines connecting DDU-1 and DDU-2 to DRU-T1. Thus, the optical fibers illustrated in FIG. 6 are exemplary and simplified and not intended to limit the number of connections provided between elements. In this implementation, TD 1 612 includes DDU1-DDU-4, TD 2 includes DDU-5-DDU-8, and the like. In FIG. 6, the set of DDUs, DDU-1 and DDU-2 feed DRU-T1-DRU-T14. The other Tunnel Distribution sites TD 2 through TD 24 provide data streams to DRU-T15 through DRU-T126.

FIG. 7 depicts a Digital Public Safety system 700 that includes multiple cross connections between DAUs, DDUs and DRUs. The primary feed 118 and secondary feed 120 are networked via a cross connection between the DAUs 706, a cross connection between the DDUs 708 (DDU16) and a cross connection between the DRUs 710 (hd37s). Redundancy in coverage is achieved by overlapping antenna radiation patterns 712. The secondary units/elements 716 work in parallel, so that should any of the primary units/elements 714 fail, secondary units/elements 716 are ready to carry on the task with a minimum switchover time. Performance of the primary units/elements 714 and the secondary units/elements 716 is monitored and information is used by decision-making logic to automatically reconfigure system units/elements, if failure is detected. Cross connection between system units/elements provide an operational system resilient to simultaneous multi-point failures. As described more fully below, embodiments of the present invention provide redundancy at several levels, including multiple, redundant DAUs at the Main Headend 718, multiple, redundant RF sections in each DAU, multiple, redundant DDUs at the Secondary Headend 720, and the like.

Referring to FIG. 7, in the illustrated embodiment, the primary feed 118 and secondary feed 120 are split between multiple DAUs. As discussed in relation to FIG. 1, the primary DAU 722 and the secondary DAU 724 have redundant RF sections (for each band served), that enable reception of the primary feed 118 and the secondary feed 120 by the DAUs. The primary DAU 722 and the secondary DAU 724 are cross connected by cross connection 706 at the digital/baseband level. The primary DAU 722 provides content in a form of data stream to the secondary DAU 724, and secondary DAU 724 provides content to the primary DAU. The primary DAU 722 and the secondary DAU 724 are cross connected 708 to a primary DDU 726 and a secondary DDU 728 as depicted in FIG. 7. The primary DDU 726 and the secondary DDU 728 are also use a cross connection between the DRUs 710, DRU-1 730 and a second DRU-2 732. The DRUs achieve redundancy by having overlapping antenna radiation patterns 712 with other DRUs.

The high service availability is achieved by 1:1 redundancy, which can also be considered as dual modular redundancy. Each element in the network (except DRU) has a secondary unit. Secondary units/elements 716 work in parallel, so that should any of the primary units/elements 714 fail, secondary unit(s) is/are ready to carry on the task with a minimum or reduced switchover time. Performance of the primary units/elements 714 and the secondary units/elements 716 is monitored and information used by decision making logic to automatically reconfigure system units/elements, if failure is detected. Cross connection between system units/network elements provide operational systems resilient to simultaneous multi-point failures. Some embodiments of the present invention provide system availability of up to and exceeding 99.999% availability, for example, in an implementation for 700 MHz Radio Systems.

As illustrated in FIG. 7, the primary DAU 722 receives, at the primary RF section (RF-P), the primary feed 118 from the splitter/combiner 734. The primary DAU 722 also receives, at the secondary RF section (RF-S), the secondary feed 120 from a second splitter/combiner 736. The splitter/combiner 734 and the second splitter/combiner 736 enable the primary feed 118 and the secondary feed 120 to be received at both the primary DAU 722 and the secondary DAU 724. Both the primary feed 118 and the secondary feed 120 are processed in by a DSP unit in each of the DAUs. A first DSP unit 723 in the primary DAU 722 generates a primary data stream 738 and a second DSP unit 725 in the secondary DAU 724 generates a secondary data stream 740 and either the primary data stream 738 or the secondary data stream 740 is selected as discussed herein. In between the Main Headend 718 and the Secondary Headend 720, as well as between the Secondary Headend 720 and the Tunnel/ Station Distribution 742, multiple optical fibers can carry either the primary feed 118 or the secondary feed 720 depending on whether the primary feed 118 or the secondary feed 120 is selected by the first DSP unit 723 in the primary DAU 722 and the second DSP unit 725 in the secondary DAU 724.

Cross connection 706 of the DAUs at the digital level is provided as illustrated in FIG. 7. The first DSP unit 723 in the primary DAU 722 is connected to the second DSP unit 725 in the secondary DAU 724 and vice versa. The connection of the first DSP unit 723 and the second DSP unit 725 enables operation in the event of failure of both RF sections in one of the DAUs. As discussed in additional detail in relation to FIG. 13, if both RF sections in the primary DAU 722 fail, the primary feed 118 or secondary feed 120 received at the secondary DAU 724 can be delivered to the first DSP unit 723 of the primary DAU 722 through the cross connection 706 between the first DSP unit 723 and the second DSP unit 725. As a result, failure of both RF sections in one of the DAUs can be compensated for through the cross connection 706 at the DSP unit level.

Figure 13:
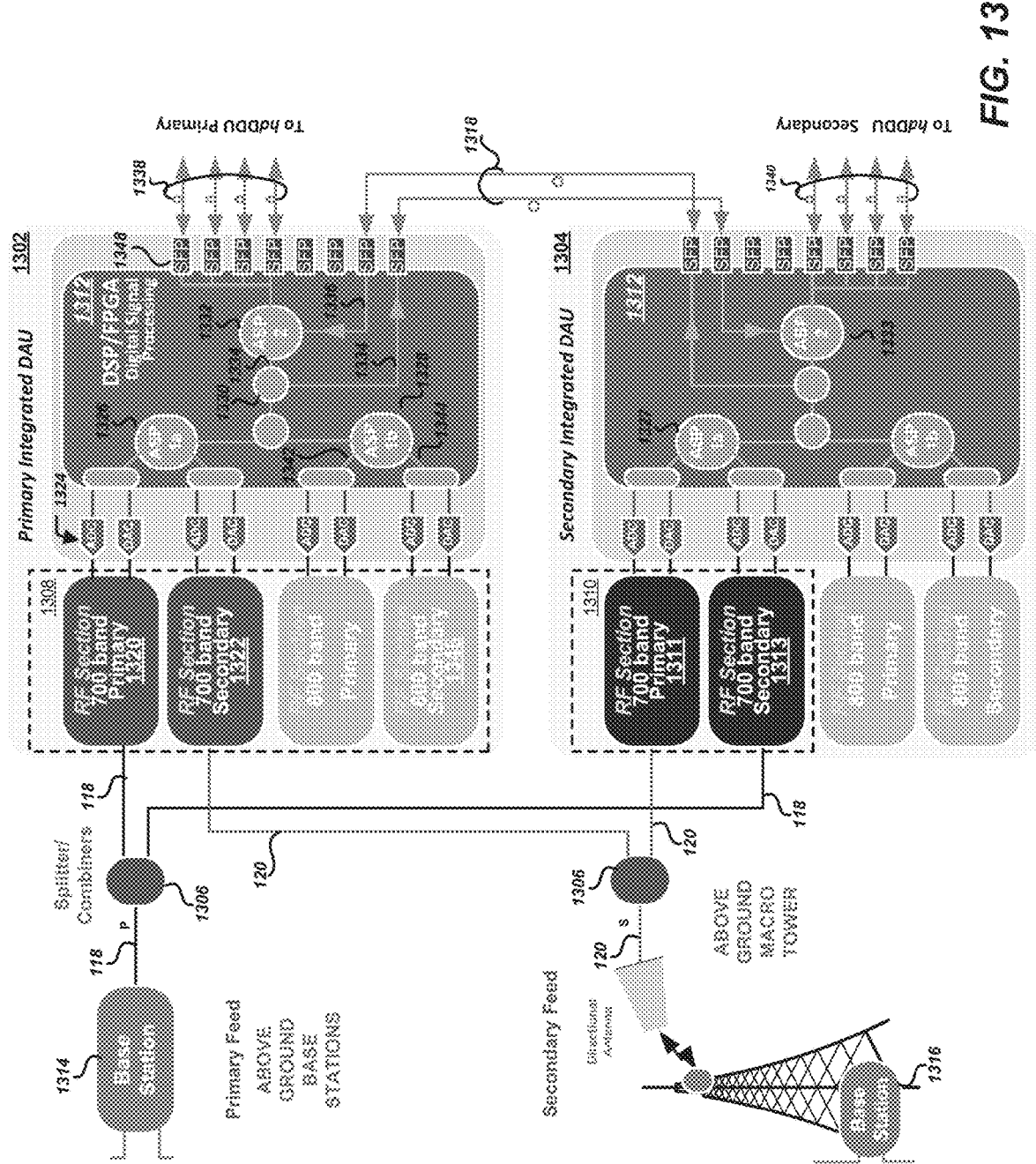
FIG. 13 is a block diagram illustrating feed and host redundancy according to an embodiment of the present invention.

Referring to FIGS. 7 and 13, the cross connection 706 is implemented, in an embodiment, by connections from the primary DAU 722 to the secondary DAU 724 and from the secondary DAU 724 to the primary DAU 722. As described herein, these are digital connections between the FPGA/DSP sections of the DAUs. Referring to FIG. 13, the connection between the first DAU and the second DAU is provided by primary data stream 1334 from the primary integrated DAU 1302 that is received by ASP2 1333 in the second integrated DAU 1304. The connection between the second DAU and the first DAU is provided by secondary data stream 1336 from the secondary integrated DAU 1304 that is received by ASP2 1332 in the first integrated DAU 1302.

Fiber redundancy between the Main Headend 718 and the Secondary Headend 720 is provided by embodiments of the present invention as illustrated in FIG. 7. For example, the primary DAU 722 outputs the primary data stream 738. The primary DAU 722 can include a first digital optical output port connected to a first input port on the primary DDU 726 and a second digital optical output port connected to a first input port on the secondary DDU 728. The secondary DAU 724 outputs the secondary data stream 740. The secondary DAU can include a first digital optical output port connected to a second input port on the primary DDU 726 and a second digital optical output port connected to a second input port on the secondary DDU 728. In the example configuration, the output from each DAU is transmitted on two fibers, one fiber connects a DAU to the primary DDU 726 and a second fiber connects the DAU to the secondary DDU 728. In a default mode, for example no failures, the primary feed 118 is processed by the primary DAU 722 and the secondary DAU 724 and the primary data stream 738 and secondary data stream 740 both transmit data associated with the primary feed 118 providing redundancy for the primary feed 118. In the default mode both DDUs then transmit the primary data stream 738 to the DRUs.

If one of the primary RF sections fails in a DAU, the DSP unit associated with the failed RF section can switch to provide the secondary feed 120 generated from the secondary RF section as the data stream. In the example embodiment, if the primary DDU 726 receives a primary data stream 738 and a secondary data stream 740 with different feeds, the logic in the DSP unit 727 of the primary DDU 726 can be configured to select a data stream to transmit to the DRUs based on one or more signal characteristics.

In FIG. 7, the dots below the DDUs 746 in the Secondary Headend and the dots below the DRUs 744 represent implementations in which additional DDUs and additional DRUs are utilized. Examples of such implementations were discussed previously in relation to FIG. 6. Examples would include implementations in which additional DRUs are provided in tunnels, additional bands are utilized, and the like. One of ordinary skill in the art would recognize many variations, modifications, and alternatives.

In the system illustrated in FIG. 7, the set of DRUs, DRU-1 730 and DRU-2 732, receive redundant digital data streams from the primary DDU 726 and the secondary DDU 728 using cross connection between the DRUs 710. DRU-1 730 includes a first input port coupled to a first output port of the primary DDU 726 and a second input port coupled to the first output port of the secondary DDU 728. DRU-2 732 includes a first input port coupled to a second output port of the primary DDU 726 and a second input port coupled to the second output port of the secondary DDU 728. DRU-1 730 and DRU-2 732 process the digital data streams and provide RF signals using an RF output port to antennas A1 and A2 respectively. A1 and A2 are arranged such that their antenna coverage areas produce overlapping antenna radiation patterns 712. Thus, redundancy is achieved through overlapping coverage, which enables the system cost to be reduced (for systems in which the number of remote units is much greater than the number of hosts and distribution units) in comparison with systems that would utilize redundant remotes. If one of the DRUs fails, then coverage in the area covered by the failed DRU will be provided by the other DRU.

Figure 24:
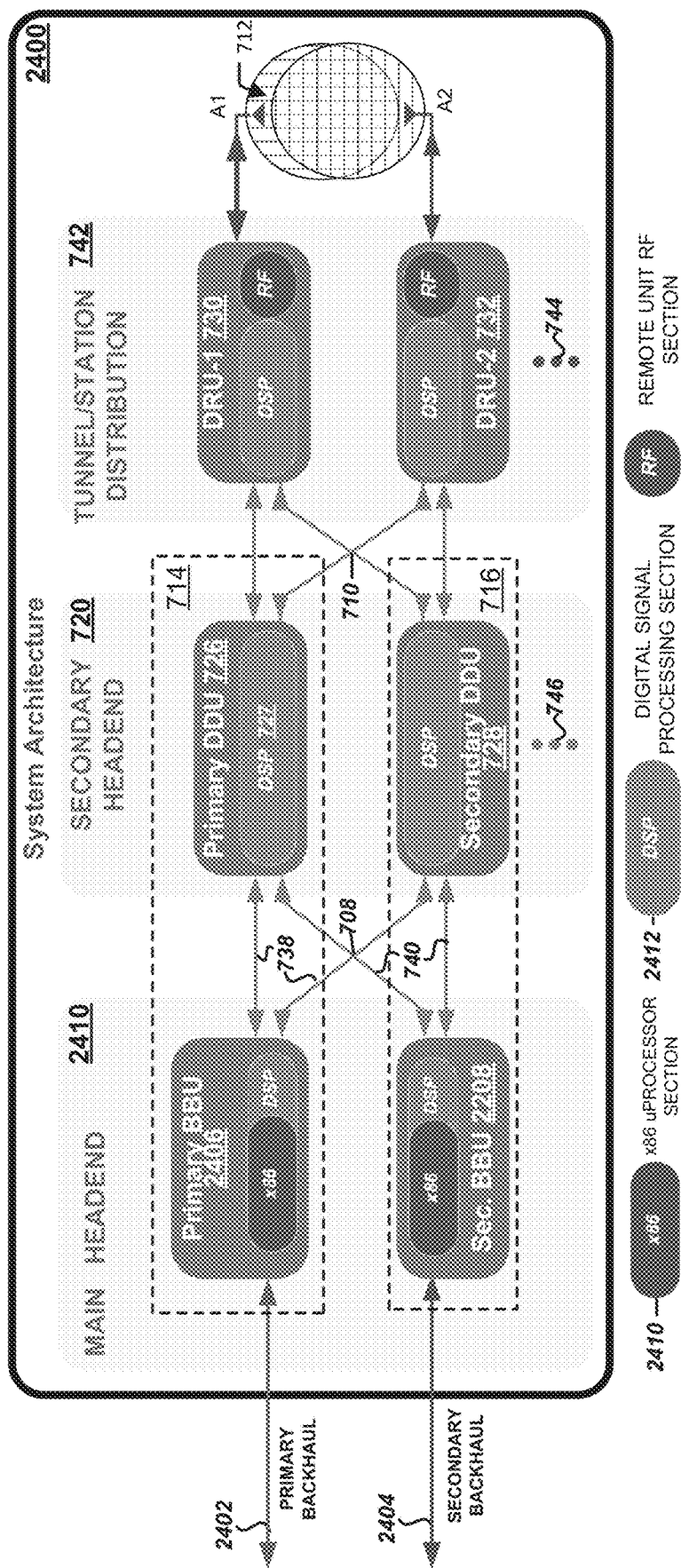
FIG. 24 is a block diagram according to one embodiment of the invention showing the basic structure of a full redundancy Public Safety Digital DAS architecture.

FIG. 24 is a block diagram according to one embodiment of the invention showing the basic structure of a full redundancy Public Safety Digital DAS architecture. FIG. 24 illustrates a system 2400 configured to interface directly with a primary backhaul connection 2402 and a secondary backhaul connection 2404. The system 2400 includes many of the features described in relation to FIG. 7 that provide redundancy in a digital public safety system including cross connections between the DAUs, DDUs, and DRUs. Accordingly, the discussion provided in relation to FIG. 7 is applicable to the system illustrated in FIG. 24 as appropriate. System 2400 replaces the primary DAU and the secondary DAU with a primary baseband unit (BBU) 2406 and a secondary BBU 2408. Each BBU includes a microprocessor section 2410 and a DSP unit 2412 to process the signals required to interface with the DDUs in the secondary headend 720 and the backhaul connections. The BBUs at the main headend 2410 include output ports that connect to the input ports on the DDUs at the secondary headend 720. In some implementations, the BBU/DDU interface may use a standard such as OBSAI (Open Base Station Architecture Initiative), CPRI (Common Public Radio Interface) and/or ORI (Open Radio Interface).

Figure 8:
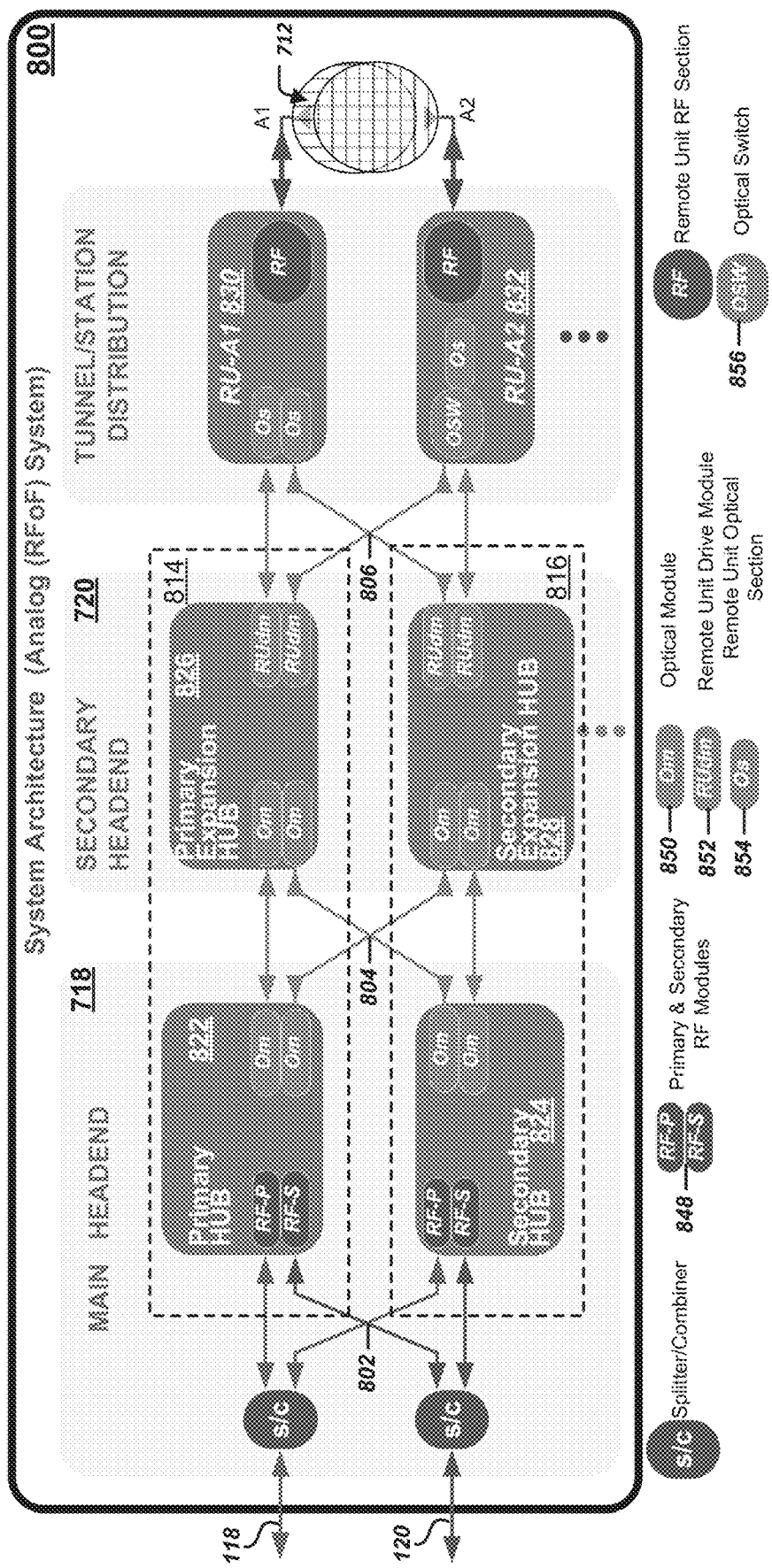
FIG. 8 is a block diagram according to one embodiment of the invention showing the basic structure of a full redundancy Public Safety Analog (RF over Fiber) DAS architecture.

FIG. 8 depicts an Analog Public Safety system that includes multiple cross connections between Main Hubs, Secondary Hubs and Remote Units (RUs). The primary feed 118 and secondary feed 120 are networked via a cross connection 802 between the main Hubs, a second cross connection 804 between the Expansion Hubs and a third cross connection 806 between the RUs (Remote Units). Redundancy in coverage is achieved by overlapping antenna radiation patterns 712. The secondary units/elements 816 work in parallel, so that should any of the primary units/elements 814 fail, secondary unit(s) is/are ready to carry on the task with a minimum switchover time. Performance of the primary and secondary units/elements is monitored and this information is used by decision-making logic to automatically reconfigure system units/elements, if failure is detected. Cross connection between system units/elements provide operational systems resilient to simultaneous multi-point failures. As described more fully below, embodiments of the present invention provide redundancy at several levels, including multiple, redundant Main Hubs at the Main Headend 718, multiple, redundant RF sections 848 and Optical Modules 850 in each Main Hub, multiple, redundant Expansion Hubs at the Secondary Headend 720, multiple, redundant Optical modules 850 and Remote Unit Drive modules 852 in each Secondary Hub, and the like.

Referring to FIG. 8, in the illustrated embodiment, the primary feed 118 and the secondary feed 120 are split between multiple Main Hubs. The primary main hub 822 and the secondary Main Hub 824 have redundant RF sections 848 (for each band served), that enable reception of the primary feed 118 and the secondary feed 120 by the Main Hubs. The primary main hub 822 and the secondary Main Hub 824 are cross connected 804 to a primary expansion hub 826 and a secondary expansion Hub 828 over primary and secondary Optical Modules 850, as depicted in FIG. 8. The primary expansion hub 826 and the secondary expansion Hub 828 are also cross connected 806 to multiple RUs, RU-A1 830 and RU-A2 832, over primary and secondary Remote Unit Drive modules 852 in the Expansion Hubs and primary and secondary optical section 854 in the RU-A1 830. In another embodiment, the RU-A2 832 optical front end is comprised of an optical switch 856 that performs selection between primary and secondary optical signals, and an optical section 854 that transfers the optical signal back to RF. The RUs achieve redundancy by having overlapping antenna radiation patterns 712 with other RUs.

Figure 9:
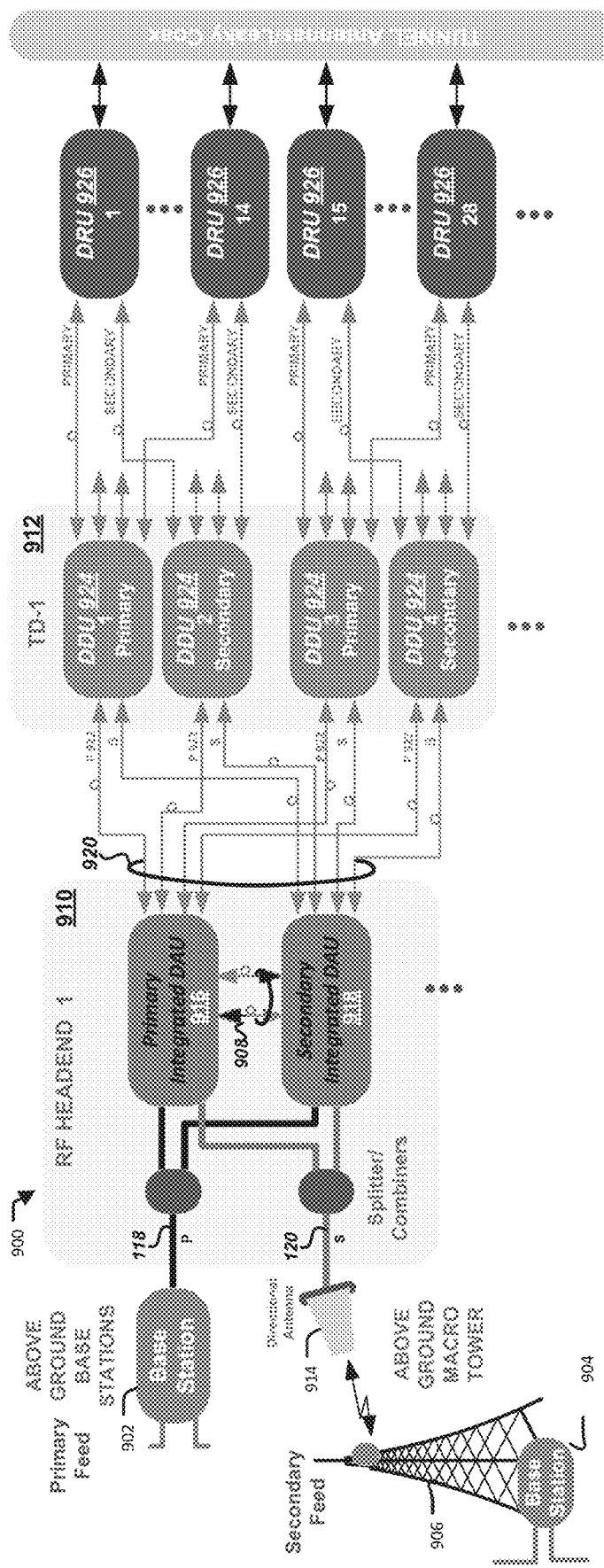
FIG. 9 is a block diagram according to one embodiment of the invention showing the basic structure of the cross connection architecture fed by a base transceiver station (BTS) on the primary path and from an off-air BTS in the secondary path.

FIG. 9 depicts a Public Safety System 900 that is fed by a combination of a Local BTS 902 and a remote BTS 904. The remote BTS 904 is the secondary feed 120 for the Public Safety architecture. The interconnection between the DAUs and the DDUs 924 as well as between the DDUs 924 and the DRUs 926 demonstrates the 1:1 redundancy of the system 900. To better illustrate the redundancy capability; any failure of either a BTS, a RF connection, a fiber, a DAU, a DDU or a DRU will be accommodated by re-routing the signals through alternative paths.

Referring to FIG. 9, redundancy of the feed is provided by a primary feed 118 from the above ground base station 902 and an off-air secondary feed 120 from the above ground tower 906. Redundancy of the host units, for example DAUs, each with redundant RF sections, and cross connection at the digital level 908 is provided in the RF Headend 1 910. TD-1 912 provides a set of redundant distribution units fed with dual fiber link, thereby providing fiber link redundancy. Redundancy at the remote locations is provided by DRUs fed with dual fiber link, adding additional fiber link redundancy.

Referring to FIG. 9, two different feeds are utilized for the primary feed 118 and the secondary feed 120: a base station 902 feed and off-air directional antenna 914 pickup from a macro tower 906. Because of the differing nature of the feeds, different types of RF sections are utilized as illustrated in the integrated DAU 300 in FIG. 3. The DSPs of the primary integrated DAU 916 and the secondary integrated DAU 918 are interconnected as discussed in relation to FIG. 7.

Primary and secondary optical fibers 920 carry the data streams from the primary integrated DAU 916 and the secondary integrated DAU 920 in the RF Headend 1 910 to the DDUs in the secondary headend TD-1 912. In this implementation, the primary optical fibers 922 from the primary integrated DAU 916 connect to four DDUs 924 in TD-1 912. The DDUs 924 then replicate the data streams and deliver or rebroadcast them to the 28 DRUs 926.

In the embodiment illustrated in FIG. 9, the secondary feed 120 is provided to the primary integrated DAU 916 and the secondary integrated DAU 918. Due to the mixed signal type feed in this embodiment (e.g., from the Base station and/or from off-air) the Host unit will have two types of RF modules. As illustrated in FIG. 3, for the off-air feed, the integrated DAU unit will have an RF module with a power amplifier and a low noise amplifier. For the Base Station feed, the integrated DAU unit will have an RF module without the PA and LNA.

Figure 10:
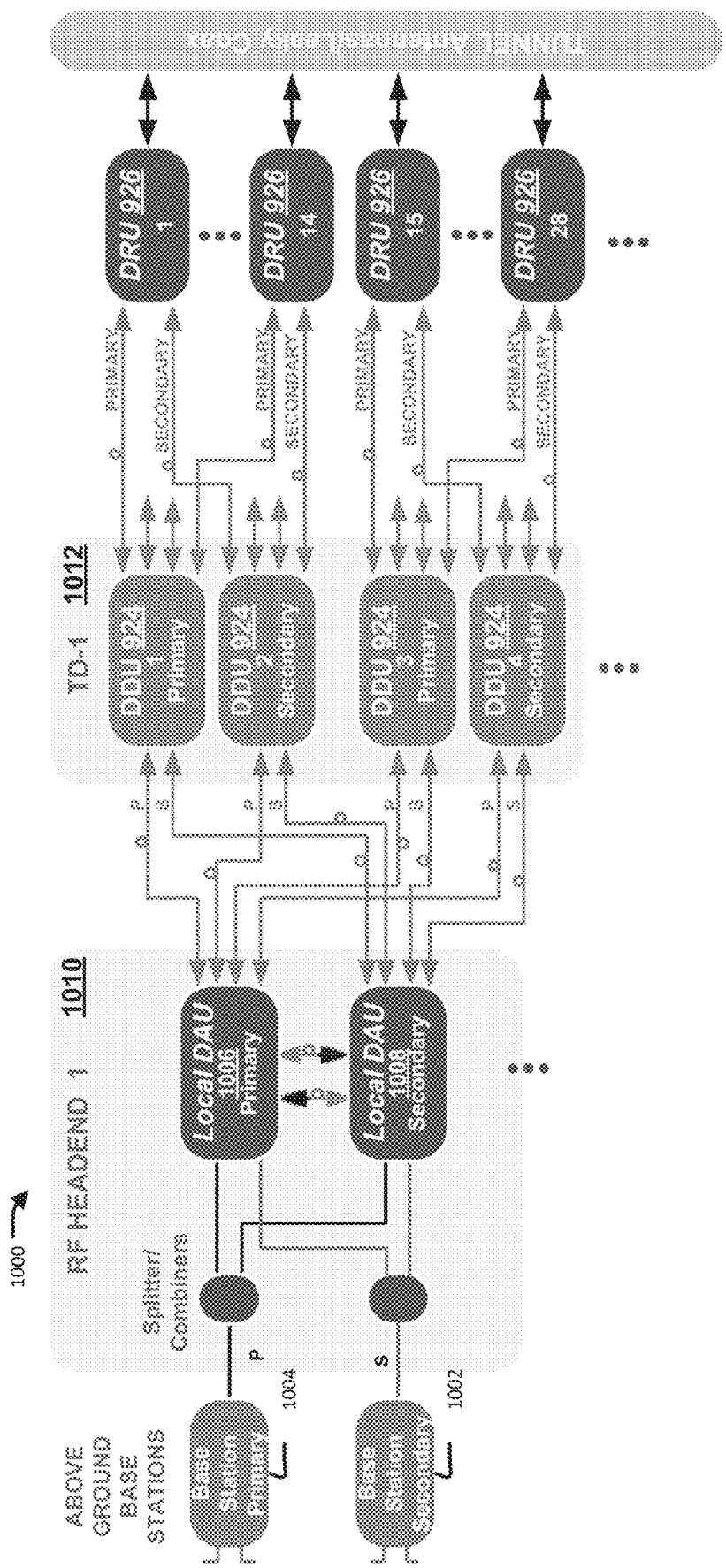
FIG. 10 is a block diagram according to one embodiment of the invention showing the basic structure of the cross connection architecture fed by a primary BTS and a secondary BTS; in this embodiment, a plurality of DRUs are fed from DDU 1 and DDU 2.

FIG. 10 depicts a Public Safety System 1000 that is fed by a combination of two Local BTSs. The secondary BTS 1002 is in hot swappable standby mode. Redundancy is provided at the base station level (set of redundant BTSs 1002, 1004), at the Headend 1010 level (set of redundant host units, primary DAU 1006 and DAU 1008, each with redundant RF sections and cross connection at the digital level), at the secondary headend 1012 level (redundant distribution units, DDU 924, fed with dual fiber link=>fiber link redundancy), and at the remote level (DRU 926, fed with dual fiber link=>fiber link redundancy). Since the feeds are provided from base stations, the host units can both be a local DAU 100 as illustrated in FIG. 1.

Figure 11:
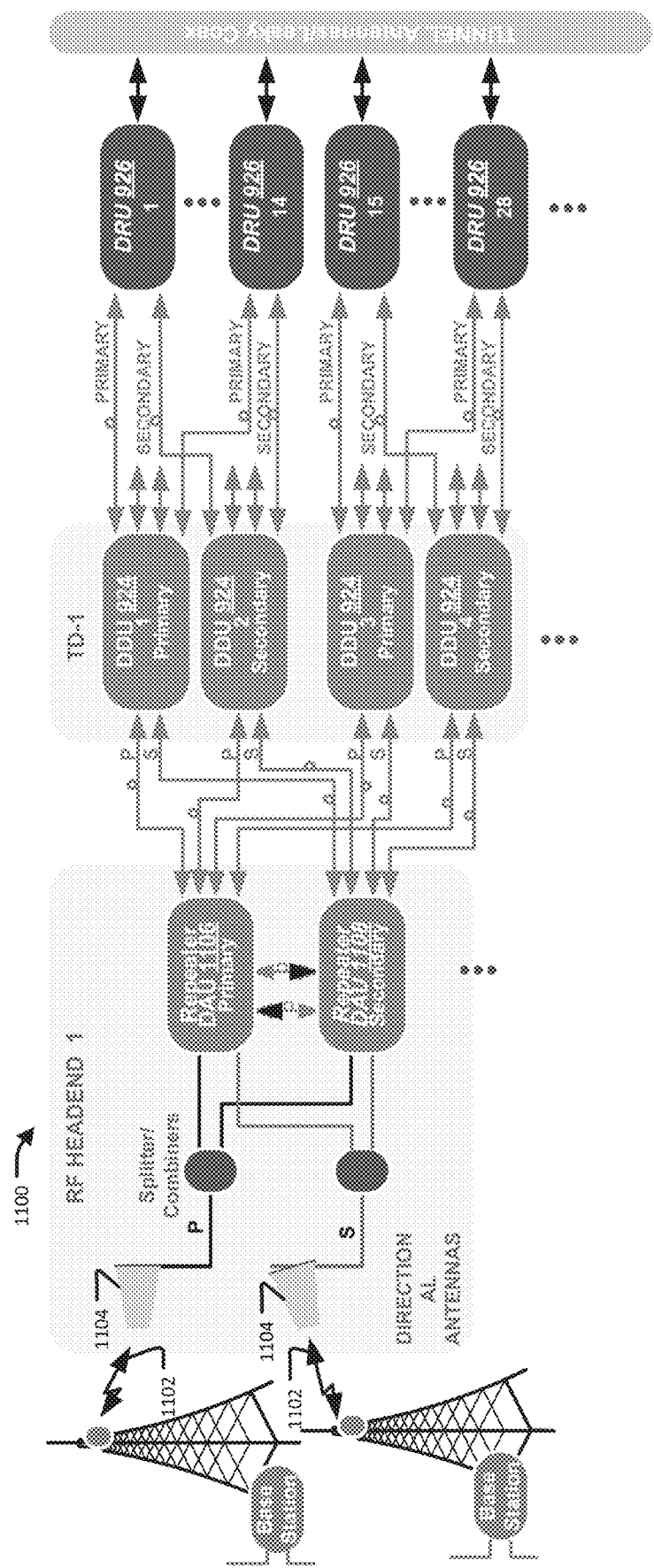
FIG. 11 is a block diagram according to one embodiment of the invention showing the basic structure of the cross connection architecture fed by a primary off-air BTS and a secondary off-air BTS, the repeater DAU has embedded repeater functionality.

FIG. 11 depicts a Public Safety System 1100 that is fed by off-air signals 1102 from a combination of two remote BTSs. Redundancy is provided in a manner similar to that discussed in relation to FIG. 10. Redundant donor directional antennas 1104 pointing to different donor sites receive RF signals. Redundant host units 1106, 1108 as illustrated by repeater DAU 200 in FIG. 2, each with redundant RF sections, and cross connection at digital level, receive the RF signals and utilize the integrated repeater function to amplify the received RF signals. Redundant distribution units, DDU 924, fed with dual fiber link provide fiber link redundancy. Redundancy at the remote units, DRU 926, is provided by feeding the remote units with a dual fiber link to provide additional fiber link redundancy.

Figure 12:
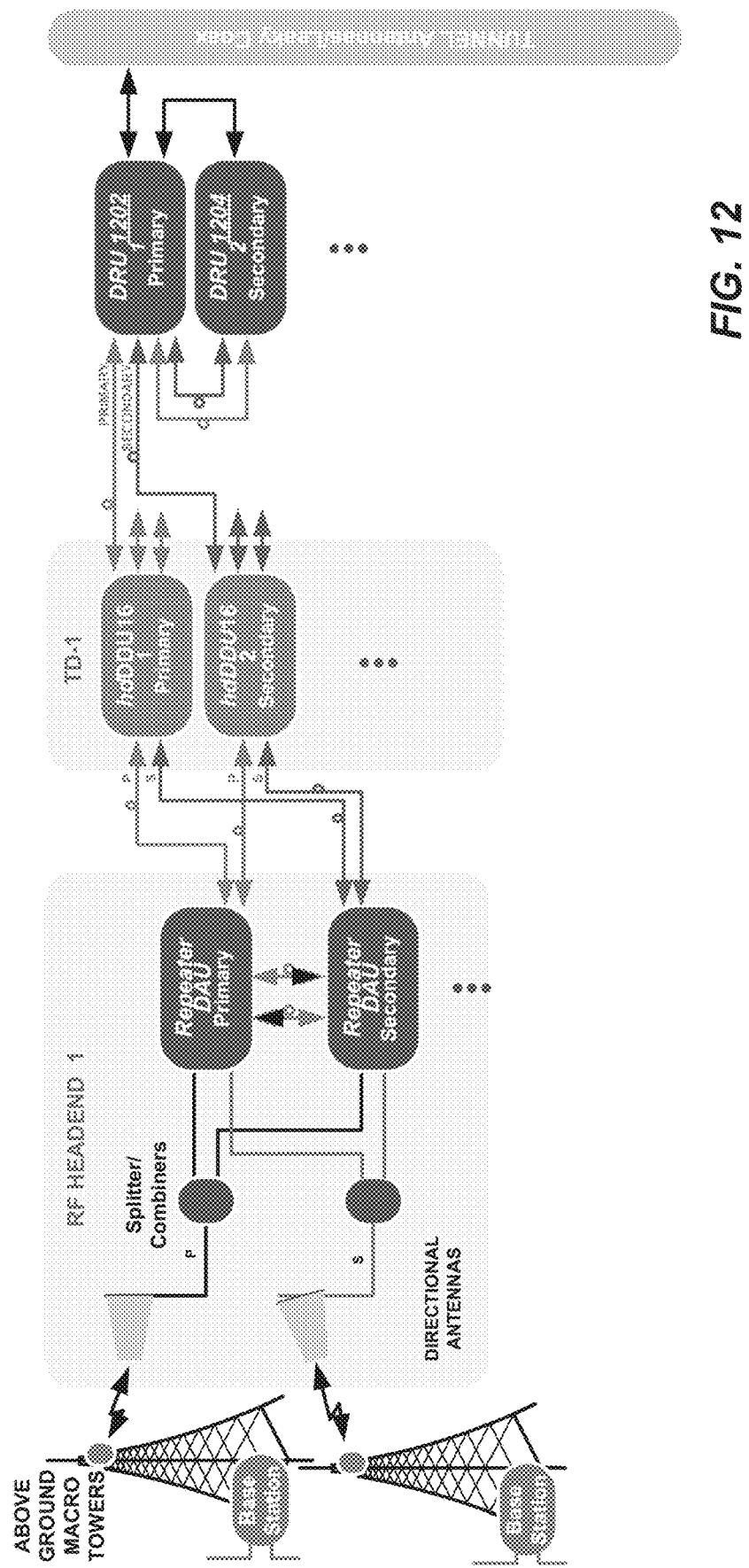
FIG. 12 is block diagram according to one embodiment of the invention showing a redundant DRU in hot standby mode and connected to the primary DRU via an optical bypass switch and RF bypass switch.

FIG. 12 depicts a Public Safety System 1200 utilizing a primary DRU 1202 and hot swappable secondary DRU 1204. In the redundant system illustrated in FIG. 7, each of the system elements is implemented in a redundant manner: Main Headend with redundant hosts; Secondary Headend with redundant DDUs; and Tunnel/Station Distribution with DRUs having overlapping coverage areas to provide redundancy at the DRUs. FIG. 12 illustrates another possible implementation in which, rather than utilizing overlapping coverage areas, a redundant secondary DRU 1204 is utilized at the remote level to provide redundancy.

In the embodiment illustrated in FIG. 12, redundancy is provided in situations, for example, applications that emphasize backup protection, in which the benefit provided by redundant DRUs outweighs the additional system cost associated with the redundant DRUs. In this implementation, 1:1 redundancy is provided in a hot standby mode. In default operation, the secondary DRU 1204 is active, but it is not processing the signal received by the primary DRU 1202. Additional description of this operation is provided in relation to FIG. 17.

According to embodiments of the present invention, architectures including a variation of a Dual Modular Redundancy (DMR) are utilized in which duplicated elements work in parallel, so that should any of the system elements/components fail, another element/component is ready to carry on system tasks with a reduced or minimum switchover time. Embodiments of the present invention utilize Active Redundancy systems in which performance of the key elements is monitored and information is used by decision-making logic to automatically reconfigure the system components if failure is detected.

FIG. 13 is a block diagram of a public safety system 1300 illustrating feed and host redundancy according to an embodiment of the present invention. The primary feed 118 and secondary feed 120 are delivered to the primary integrated DAU 1302 and the secondary integrated DAU 1304 via a splitter/combiner 1306 such that they are fed to a redundant RF section 1308 in the primary integrated DAU 1302 and a second redundant RF section 1310 in the secondary integrated DAU 1304. As illustrated in FIG. 13, both primary integrated DAU 1302 and secondary integrated DAU 1304 have both primary and secondary RF sections at one or more bands (e.g., 700 band and 800 band). In some embodiments, the primary integrated DAU 1302 and/or the secondary integrated DAU 1304 are quad-band units, providing primary and secondary RF sections at two bands. Thus, the primary feed 118 is provided to primary RF section 1320 and secondary RF section 1313 and the secondary feed 120 is provided to primary RF section 1311 and secondary RF section 1322. Both of the primary feed 118 and secondary feed 120 are translated into the digital domain and processed inside the DSP Unit 1312 in each of the DAUs. The primary integrated DAU 1302 utilizes the digital signal processing functionality provided by the DSP Unit 1312 to implement two decision points: monitoring and/or selection of primary feed 118 or secondary feed 120 provided by the primary BTS 1314 or the secondary source 1316, and monitoring and/or selection of a primary/secondary feed from the secondary integrated DAU 1304 received over a fiber connecting the DAUs 1318 (e.g., the secondary integrated DAU 1304) in case the primary feed 118 or the secondary feed 120 is not available due to primary host failure. One of skill in the art will understand that the fiber connecting the DAUs 1318 corresponds to cross connection 706 in FIG. 7.

In default operation, considering the primary host (primary integrated DAU 1302), both the primary feed 118 processed by the primary RF section 1320 and the secondary feed 120 processed by the secondary RF section 1322 are converted to digitals signals using the ADCs 1324 and presented to Automated Selection Point 1*a* (ASP1*a*) 1326. The switch represented by the logic implementing ASP1*a* 1326 is set such that the digital signal associated with the primary feed 118 is passed through ASP1*a* 1326 by default. The digital signal passed by ASP1*a* 1326 is then combined with the optional digital signal passed through a second ASP1*b* 1328 receiving digital signals at the optional 800 MHz band. Thus, ASP1 logic is provided for each band that is implemented in the hosts.

A splitter 1330 is utilized to provide a copy of the combined signal, local data stream 1334, to Automated Selection Point 2 (ASP2) 1333 of the secondary integrated DAU 1304. If the combined signal provided by ASP2 1332 of the primary integrated DAU 1302 is suitable for broadcast, the switch represented by the logic implementing ASP2 1332 passes the combined signal for delivery to the DDUs. Similar operation is carried out concurrently or simultaneously in the secondary integrated DAU 1304, which also receives the primary feed 118 and the secondary feed 120. Modifications from default operation are also provided by embodiments of the present invention.

At the first decision point, an Automated Selection Point 1*a* (ASP1*a*) 1326 passes the primary feed 118 (signal) or switches to the secondary feed 120 (signal) output by the secondary RF section 1322 if loss of primary feed 118 (signal) is detected (e.g., which could result from primary BTS 1314 or primary RF section 1320 failure). Thus, measurements of the digital signals output by the ADCs 1324 coupled to each of the primary RF section 1320 and the secondary RF section 1322 made at the ASP1*a* 1326 enable ASP1*a* 1326 to pass the primary feed 118 (signal) as a default or switch to the secondary feed 120 (signal) if the quality of the primary feed 118 (signal) is below a threshold. Thus, if the performance of the primary feed is below a threshold, then ASP1*a* can switch to the secondary feed, which can then be passed to splitter 1330.

At the second decision point, a second Automated Selection Point (ASP2) 1332 passes the local data stream 1334 or switches to an external data stream 1336 provided by a secondary host (secondary integrated DAU 1304) if loss of the local data stream 1334 is detected (e.g., which could result, for instance, from both RF sections or ADC/DAC circuit failure). In an embodiment, ASP2 1332 will pass the local data stream 1334 as a default.

In an embodiment, if failure (e.g., performance below a threshold) of both primary RF section 1320 and second RF section 1322 occurs, resulting in loss of output from ASP1*a* 1326 (assuming no signal at the second band), no signal will be received at splitter 1330. In this embodiment, ASP2 1332 will thus select the external data stream 1336 for rebroadcasting if the quality of the local data stream 1334 is below a threshold. The external data stream 1336 is an output of ASP1*a* 1327 in the secondary integrated DAU 1304. Thus, digital content from the secondary integrated DAU 1304 is delivered as external data stream 1336 to ASP2 1332 in the primary integrated DAU 1302, and, in turn, to primary fibers 1338. The primary fibers are connected to one or more digital optical output ports 1348. The one or more digital optical output ports include a first digital optical output port connected to a primary DDU and a second digital optical output port connected to a secondary DDU.

Accordingly, digital cross connection between the RF sections of the DAUs is provided by embodiments as previously discussed in relation to FIG. 7. As a result, the system 1300 is able to maintain the signal on both the primary fibers 1338 and secondary fibers 1340 to the primary and secondary DDUs respectively. Thus, embodiments of the present invention enable operational signals on either or both primary fibers 1338 and secondary fibers 1340 to be maintained, even in the event of failure of the RF sections and/or DSP unit in either the primary integrated DAU 1302 or the secondary integrated DAU 1304. In some implementations, the ASP1*a* 1326 or ASP1*b* 1328 or ASP2 1332 switching time is less than a few seconds, for example, less than 2 sec.

In FIG. 13, the 800 MHz band is illustrated as optional. If the 800 MHz band is utilized, the DSP unit 1312 receives primary and secondary data streams for both bands from the primary and secondary RF sections associated with each band. In the illustrated embodiment, the DSP unit 1312 receives a primary 800 MHz data stream 1342 and a secondary 800 MHz data stream 1344. The 800 MHz band includes the second Automated Selection Point 1 (ASP1*b*) 1328 that passes the primary 800 MHz data stream 1342 or switches to the secondary 800 MHz data stream 1344 output by the secondary RF section 1346 if loss of the primary data stream 1342 at the 800 MHz band is detected. Data streams representing different bands are aggregated and then delivered to the second Automated Selection Point (ASP2) 1332 that passes the local data stream 1334 or switches to an external data stream 1336 provided by a secondary host (secondary integrated DAU 1304) if loss of the local data stream 1334 is detected.

In both the primary integrated DAU 1302 and the secondary integrated DAU 1304, the primary and secondary streams are provided to the DSP unit 1312. If the primary integrated DAU 1302 fails such that the redundant RF section 1308 has failed and the primary integrated DAU 1302 loses both data streams, the system 1300 can provide self-healing. The system 1300 can use the data stream produced by the DSP unit 1312 in the secondary integrated DAU 1304 (e.g., the primary RF Section data stream) and can deliver this data stream to the DSP unit 1312 in the primary integrated DAU 1302. The system can transmit the data stream to the primary DDUs after passing the data stream through ASP2 1332 in the DSP unit 1312 in the primary integrated DAU 1302. The same data stream will be provided by the second integrated DAU 1304 to the secondary DDUs. Accordingly, both the primary and secondary data streams can be maintained on the fiber connecting the DAUs 1318 (Main Headend) and the DDU units (Secondary Headend). If the primary data stream is produced by the DSP unit 1312 in the secondary integrated DAU 1304, then this primary data stream is provided to the DSP unit 1312 in the primary integrated DAU 1302 for transmission to the Secondary Headend. If the secondary data stream is produced by the DSP unit 1312 in the secondary integrated DAU 1304, then this secondary data stream is provided to the DSP unit 1312 in the primary integrated DAU 1302 for transmission to the Secondary Headend. It should be noted that the discussion provided in relation to the operation of primary integrated DAU 1302 is applicable to secondary integrated DAU 1304 as appropriate. One of ordinary skill in the art would recognize many variations, modifications, and alternatives.

All of the components in FIG. 13 may be active and operating in parallel to provide redundancy. The ASP points can be rerouting signals based on monitoring conditions of the system. ASP points can be monitoring any data associated with the digital domain. In addition to monitoring the power of the digital signals, the I/Q content of the signal can be analyzed to determine the quality of the primary feed 118 and/or the secondary feed 120. Thus, monitoring and analysis of the feeds is not limited to complete loss of signal (e.g., cutting of primary feed 118), but can include metrics related to the quality of the signals.

Figure 20:
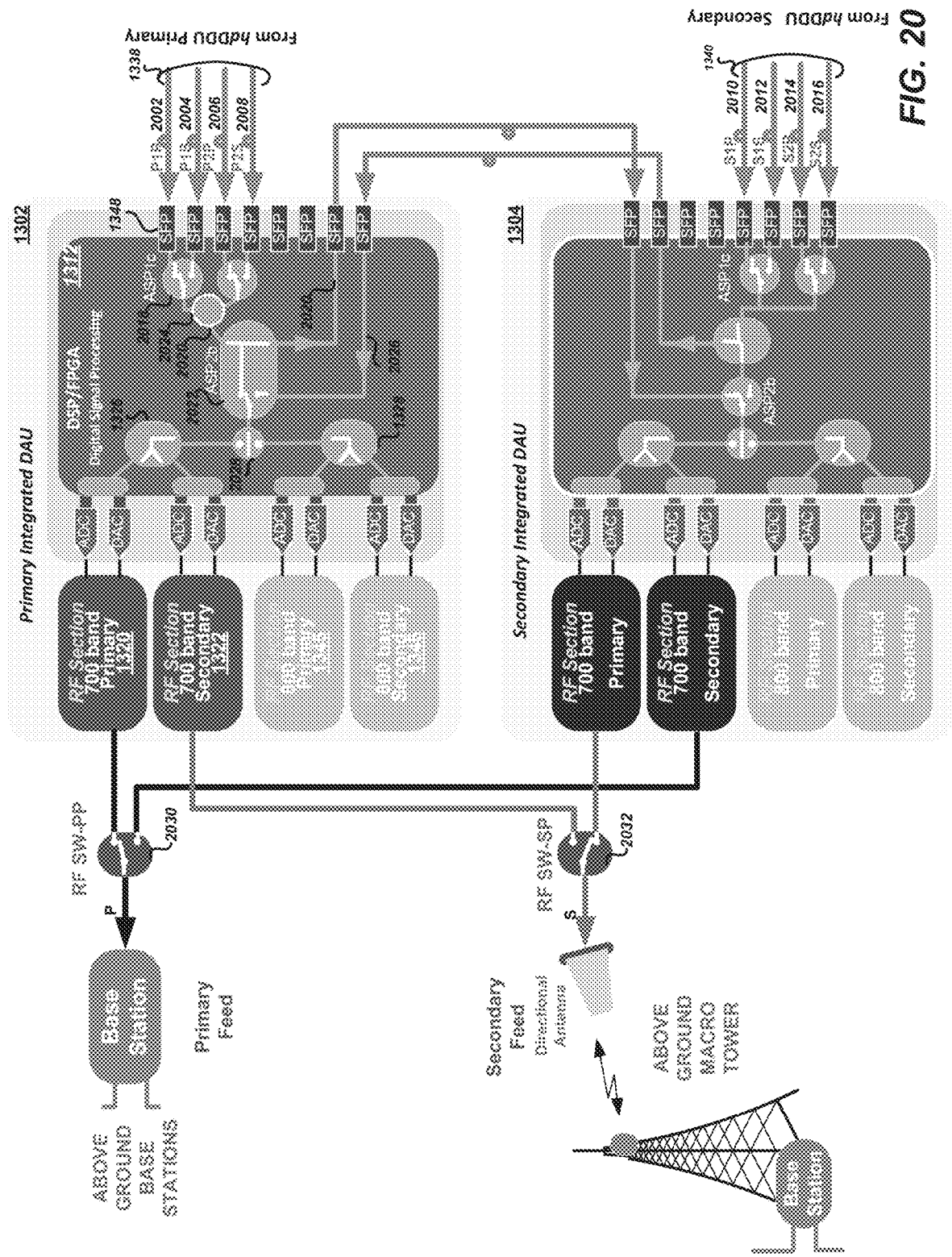
FIG. 20 is a block diagram illustrating uplink redundancy according to one embodiment of the present invention showing the basic structure of a full redundancy digital DAS architecture.

FIG. 20 is a block diagram illustrating uplink redundancy according to one embodiment of the present invention showing the basic structure of a full redundancy digital DAS architecture. Multiple uplink primary data streams are received on the primary fibers 1338 and secondary fibers 1340 from the primary and secondary DDUs, respectively. In the illustrated embodiment, the uplink data streams received at the primary integrated DAU 1302 from multiple DDUs include a primary data stream carrying the primary uplink feed for the 700 MHz Band, P1P 2002; a primary data stream carrying the secondary uplink feed for the 700 MHz Band, P1S 2004; a primary data stream carrying the primary uplink feed for the 800 MHz Band, P2P 2006; and a primary data stream carrying the secondary uplink feed for the 800 MHz Band, P2S 2008. Further, the uplink data streams received at the secondary integrated DAU 1304 from multiple DDUs include a secondary data stream carrying the primary uplink feed for the 700 MHz Band, S1P 2010; a secondary data stream carrying the secondary uplink feed for the 700 MHz Band, S1S 2012; a secondary data stream carrying the primary uplink feed for the 800 MHz Band, S2P 2014; and a secondary data stream carrying the secondary uplink feed for the 800 MHz Band, S2S 2016.

DSP Unit 1312 is configured to implement ASP1*c* 2018. ASP1*c* 2018 passes a data stream carrying the primary uplink feed by default (P1P 2002, P2P 2006, S1P 2010, S2P 2014). ASP1*c* 2018 can be configured to monitor the data stream carrying the primary uplink feed and switch to a data stream carrying the secondary uplink feed (P1S 2004, P2S 2008, S1S 2012, S2S 2016) if loss of primary uplink feed is detected (primary optical path loss, or primary hdDDU failure) The outputs of ASP1*c* can be summed 2024 to create a local uplink data stream 2020 and passed to ASP2*b* 2022.

The local uplink data stream 2020 is split by the DSP unit 1312 at ASP2*b* 2022 and a copy of the local uplink data stream 2020 is transmitted to the secondary integrated DAU 1304. ASP2*b* 2022 can include logic that monitors the local uplink data stream 2020 and controls the output using a switch. If a characteristic of the local uplink data stream 2020 does not meet a signal or data stream threshold, ASP2*b* 2022 can select a backup uplink data stream 2026 from the secondary integrated DAU 1304. In some embodiments, ASP2*b* 2022 can receive data related to the integrity of the local uplink data stream 2020 from ASP1*c* 2018. The uplink data stream output from ASP2*b* 2022 is delivered to the appropriate RF section by a splitter/combiner 2028. The uplink data stream is further split at ASP1*a* 1326 and ASP1*b* 1328 and transmitted to both the 700 MHz primary RF section 1320 and the 700 MHz secondary RF section 1322 and the 800 MHz primary RF section 1345 and the 800 MHz secondary RF section 1346 respectively. In some implementations, ASP1*a* 1326 may receive a status for the redundant RF section and select an RF section to receive the upstream signal using a switch. The RF Switch (RF SW-PP) 2030 passes a primary RF signal from the primary integrated DAU 1302, or switches to an RF signal from the secondary primary integrated DAU 1304 if the primary RF signal is lost. RF SW-SP 2032 passes a primary RF signal from the secondary integrated DAU 1304, or switches to a secondary RF signal from the primary integrated DAU 1302 if the primary RF signal is lost. Both RF switches RF signal is deliver the RF signal to the associated Base Station.

Figure 14:
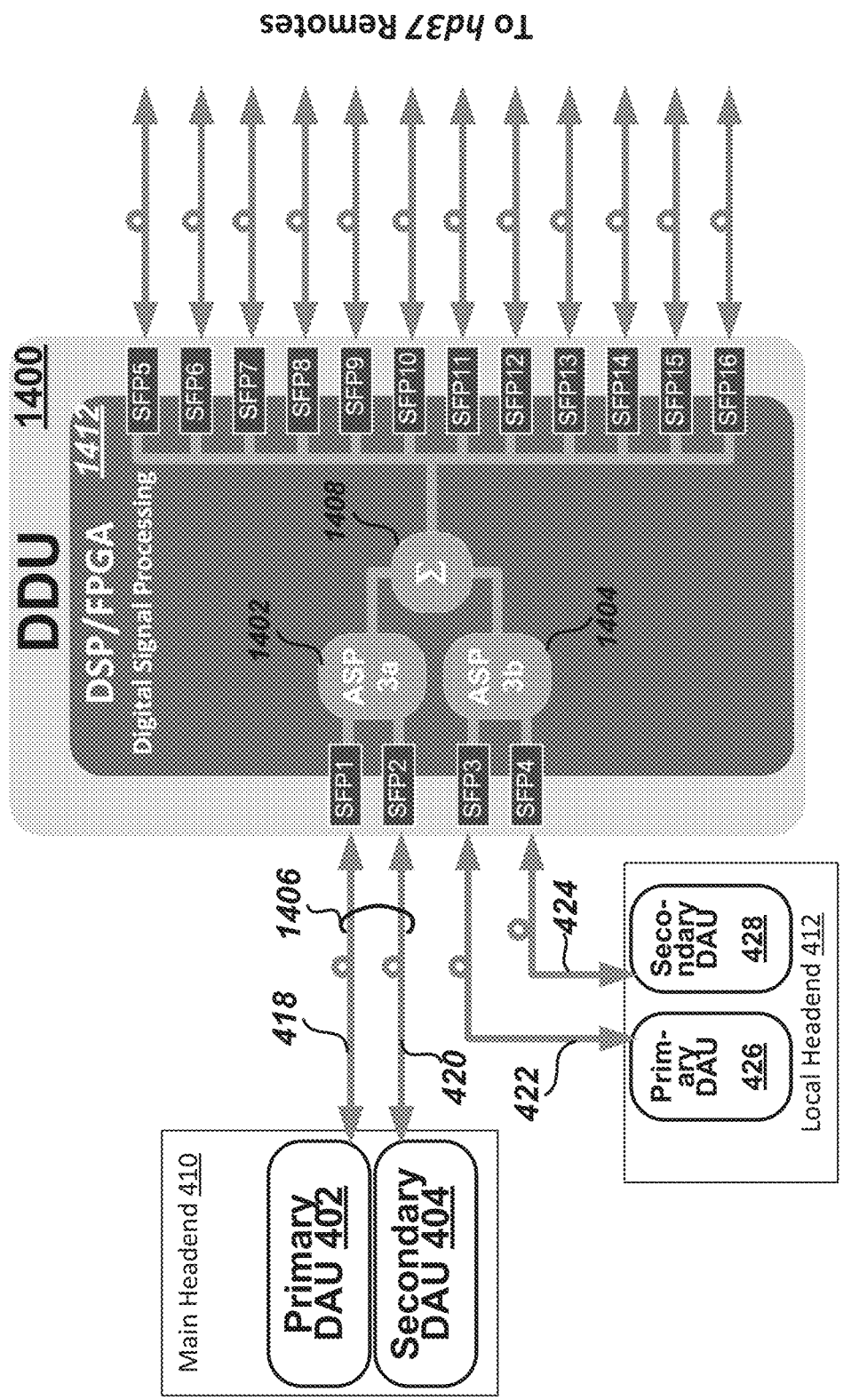
FIG. 14 is a block diagram illustrating DDU main feed redundancy, local feed redundancy, and aggregation of the main and local content according to an embodiment of the present invention.

FIG. 14 is a block diagram illustrating DDU 400 fiber (feed) redundancy and aggregation capability according to an embodiment of the present invention. In the default mode of operation, the digital distribution unit (DDU) 400 receives the primary digital data stream 418 and the secondary digital data stream 420 from the primary host unit (primary DAU 402) and the secondary host unit (Secondary DAU 404) located at the Main Headend 410 location, which can be referred to as the primary data stream 418 and the secondary data stream 420. A main Automated Selection Point 3*a* (ASP3*a*) 1402 passes the primary data stream 418 by default or switches to the secondary data stream 420 if loss of the primary data stream 418 is detected (e.g., which could result from the primary host (primary DAU 402)

failing or failure of the primary fiber optic cable 1406 connecting the host and the DDU).

FIG. 14 illustrates local content represented by a primary local data stream 422 and a secondary local data stream 424 from a Local Headend 412. Thus, the DDU 1400 has the capability to receive and aggregate local content converted to a digital data stream (for example, at the 700 MHz or the 800 MHz bands). If local content is present, for example, from a separate municipality represented by the local headend, then a local ASP3b 1404 receives the data streams at small form factor port (SFP) 3 and SFP4 and passes the primary local data stream 422 by default or switches to the secondary local data stream 424 if loss (e.g., operation below a threshold) of the primary local data stream 422 is detected. A combiner 1408 sums the data streams provided by the main ASP3a 1402 and/or the local ASP3b 1404 for delivery of aggregated data to the DRUs.

It should be noted that in the implementation illustrated in FIG. 14, both the primary and secondary DDUs have similar functionality. The processing conducted inside the DSP unit 1412 in the DDUs can be remotely updated/reconfigured. The ASP points are rerouting signals based on monitoring conditions of the system. ASP points can be monitoring any data associated with the digital domain. In addition to monitoring the quality of the digital data streams, the I/Q content associated with the signal can be analyzed to determine the quality of the primary feed 118 and the secondary feed 120. The logic implementing ASP3 can provide switching times in millisecond range.

Figure 21:
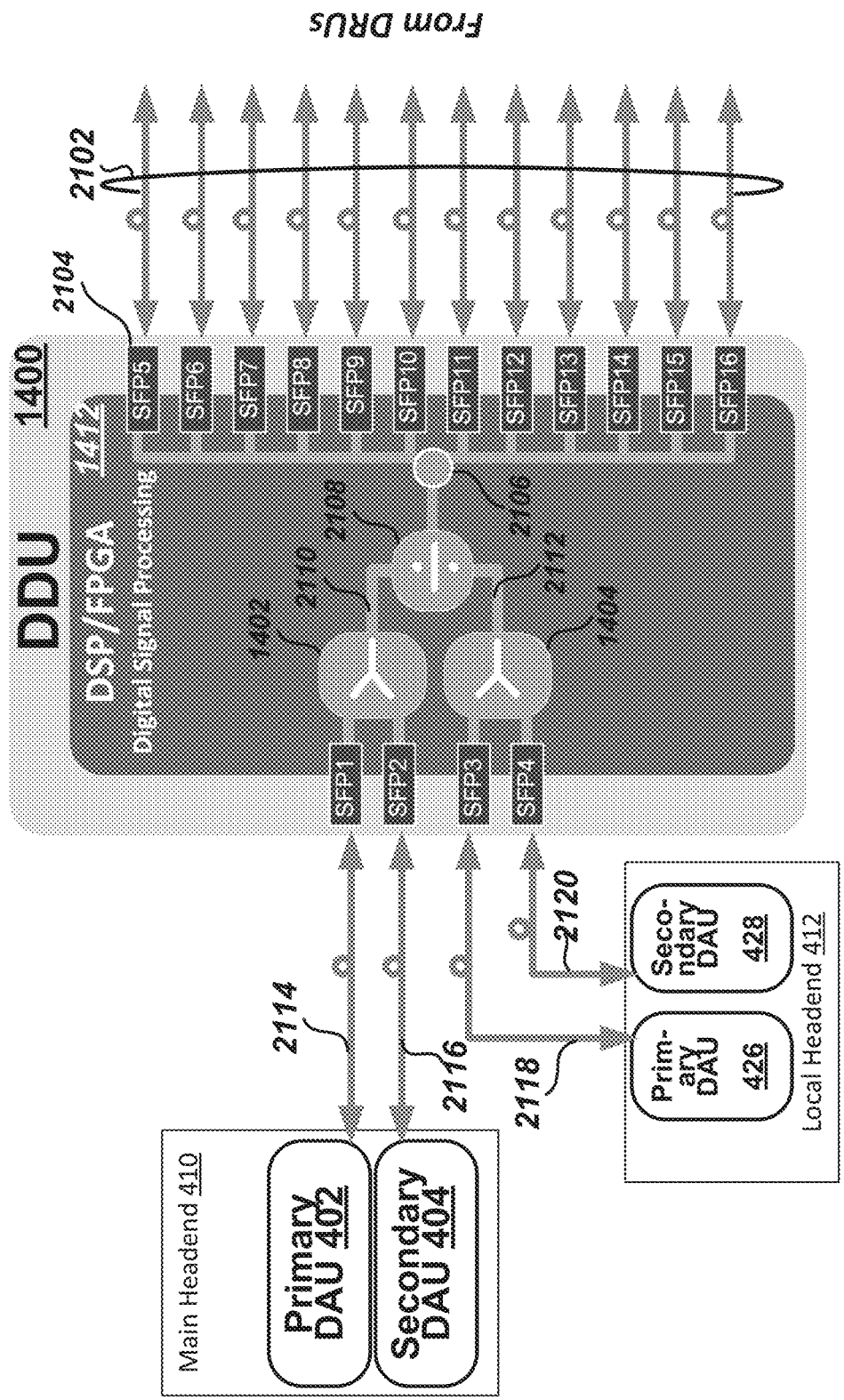
FIG. 21 is a block diagram illustrating DDU uplink signal redundancy to a main headend and a local headend.

FIG. 21 is a block diagram illustrating DDU uplink signal redundancy to the main headend and the local headend feed. The DDU 1400 receives an uplink digital data stream generated by DRUs over a plurality of fiber optic connections 2102 connected to a plurality of input ports 2104. The plurality of input ports 2104 are coupled to the DSP unit 1412. In some embodiments, the DSP unit 1412 can include logic that processes the uplink digital data stream generated by the DRUs. The DSP unit 1412 includes a summer 2106 that combines the uplink digital data streams coming from multiple DRUs. Next, the DSP Unit 1412 delivers the uplink digital data stream to a splitter 2108 that separates the uplink digital data stream into two signals, a first uplink digital data stream 2110 for the main headend 410 and a second uplink digital data stream 2112 for the local headend 412. The main ASP3a 1402 splits the first uplink digital data stream 2110 for simultaneous transmission over the primary optical path 2114 and the secondary optical path 2116 to the Main Headend. Local ASP3b 1404 splits the second uplink digital data stream 2112 for simultaneous transmission over the primary optical path 2118 and the secondary optical path 2120 to the local headend 412.

Figure 15:
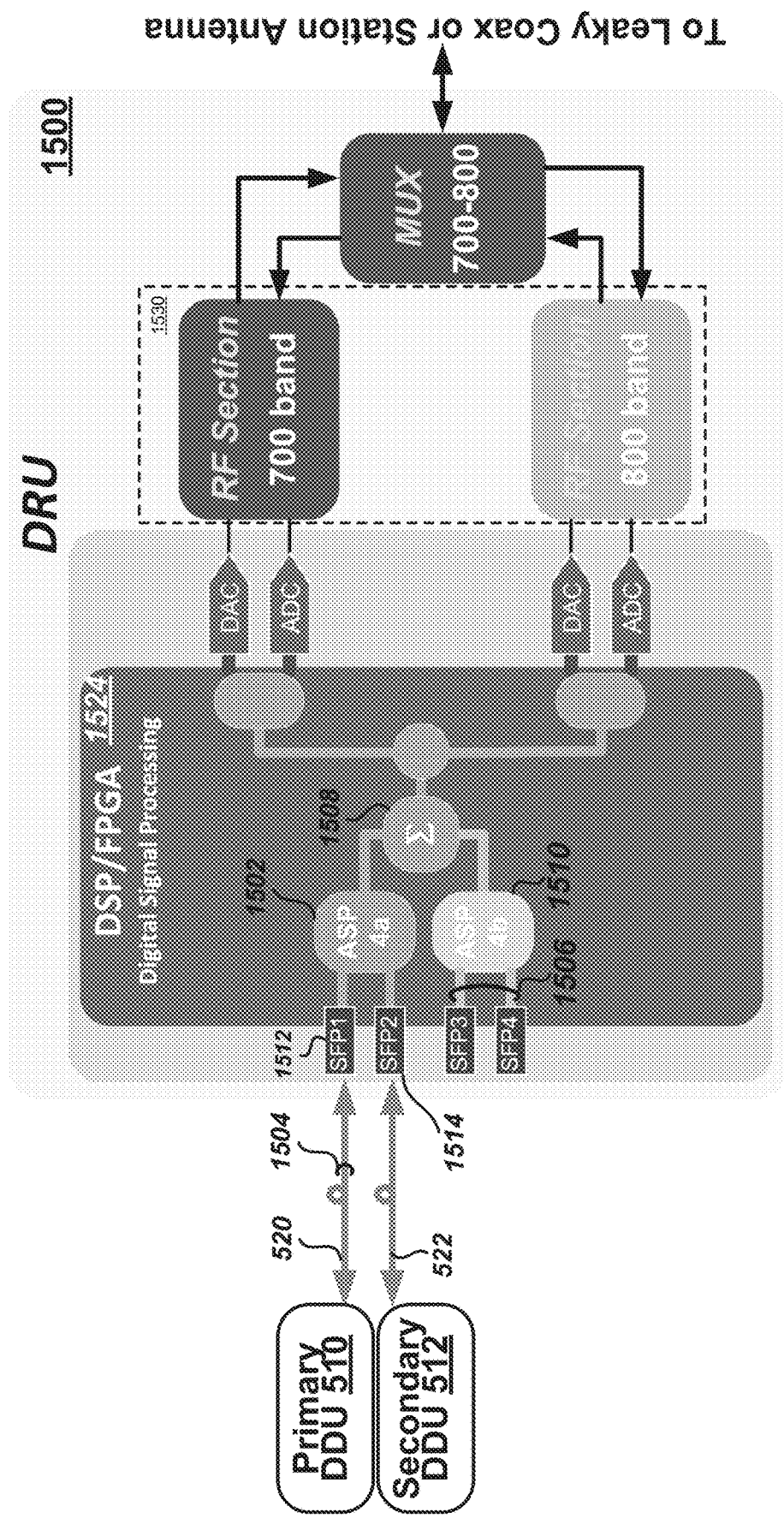
FIG. 15 is a block diagram illustrating feed to DRU redundancy according to an embodiment of the present invention.

FIG. 15 is a block diagram illustrating fiber to remote redundancy according to an embodiment of the present invention. FIG. 15 illustrates elements of the digital remote unit (DRU) 1500 and redundancy provided at the DRU. The DRU 1500 receives the primary digital data stream 520 and the secondary digital data stream 522 from the digital distribution units primary DDU 510 and secondary DDU 512. The primary digital data stream 520 and the secondary digital data stream 522 are received at a primary optical port 1512 and a secondary optical port 1514 respectively. An Automated Selection Point 4a (ASP4a) 1502 passes the primary digital data stream 520 or switches to the secondary digital data stream 522 if loss of primary digital data signal is detected (which could result, for example, from failure of the primary DDU 510 or the primary fiber optic cable 1504 failing). Similar processing can be performed for optional bands that are utilized as well as summing as appropriate. The RF sections 1530 translate the digital signal to the analog domain for subsequent broadcast through the broadcast media, including a leaky coaxial cable or a station antenna, after multiplexing as appropriate.

Implementation of the DSP unit 1524 using an FPGA enables the processing conducted by the DSP unit 1524 to be remotely updated/reconfigured as appropriate. The ASP points are rerouting signals based on monitoring conditions of the system. ASP points can be monitoring any data associated with the digital domain. In addition to monitoring the quality of the digital data streams, the I/Q content associated with the signal can be analyzed to determine the quality of the primary feed 118 and the secondary feed 120. Additionally, switching times for the ASP4a 1502 in the DRU 1500 are on the order of the millisecond range.

In FIG. 15 optional primary and secondary data streams 1506 at a second (e.g., 800 MHz) band are illustrated. Thus, the DRU 1500 has the capability to receive and aggregate content at different bands (for example, at the 700 MHz or the 800 MHz bands). If the optional band is present, for example, from a separate municipality, then a second ASP4b 1510 receives the data streams at SFP3 and SFP4 and passes the primary data stream in the optional band or switches to the secondary data stream in the optional band if loss of the primary data stream in the optional band is detected. A combiner 1508 sums the data streams provided by the main ASP4a 1502 and/or optional band second ASP4b 1510 for production of aggregated data at the DRUs.

Figure 16:
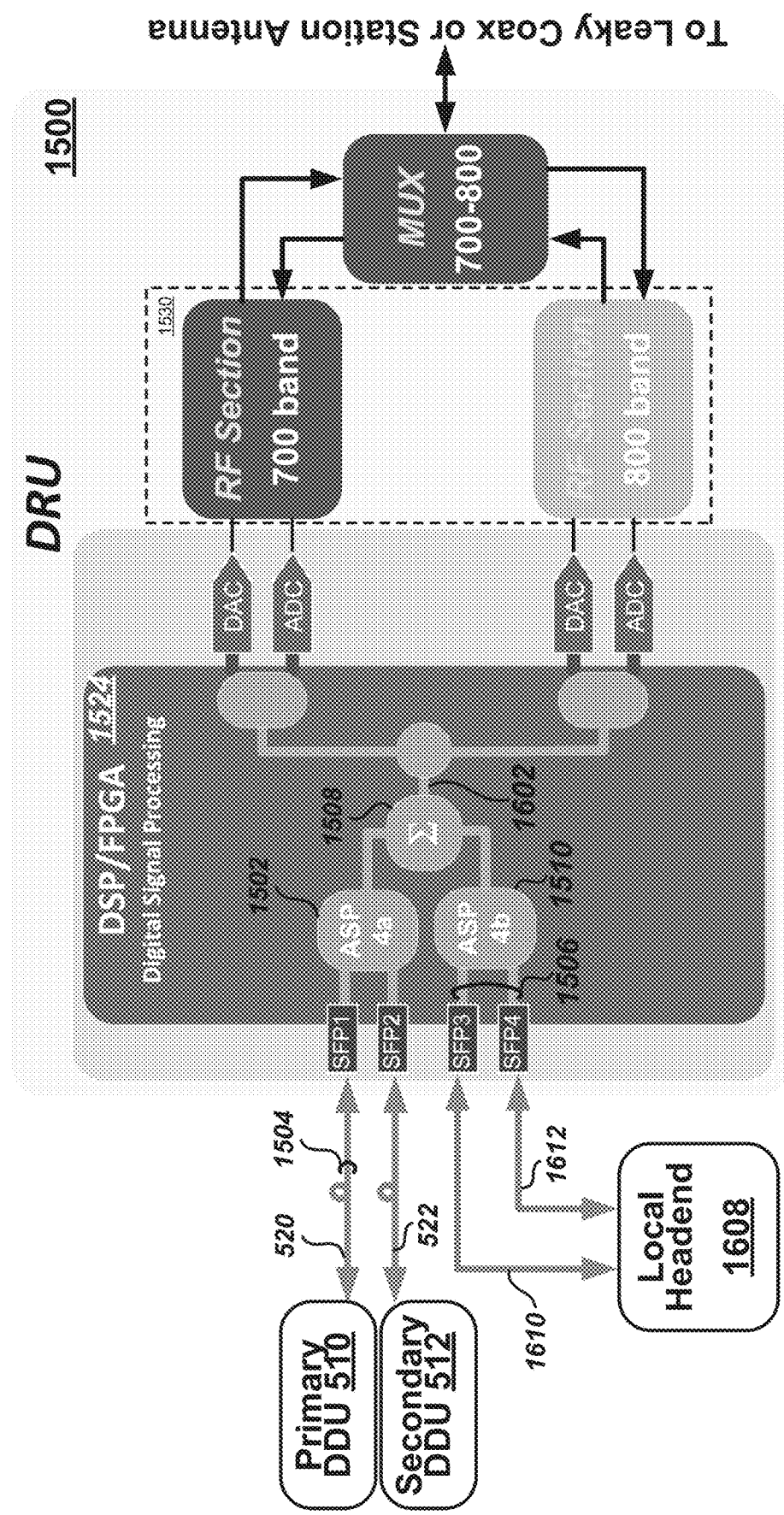
FIG. 16 is a block diagram illustrating DRU main feed redundancy, local feed redundancy, and aggregation of a main and local content according to an embodiment of the present invention.

FIG. 16 is a block diagram illustrating redundancy at a remote unit, DRU 1500, through local aggregation according to an embodiment of the present invention. FIG. 16 shares similarities with FIG. 15 and description provided in relation to FIG. 15 is applicable to FIG. 16 as appropriate. The DRU 1500 has ability to receive and aggregate local content converted to a digital data stream 1602 (for example, at the 700 MHz or the 800 MHz bands). Thus, the DRU 1500 provides an alternative approach for local content aggregation that can supplement or be utilized in place of local content aggregation that is performed at the DDU. Implementation of the DSP unit 1524 using an FPGA enables the processing conducted by the DSP unit 1524 to be remotely updated/reconfigured as appropriate.

FIG. 16 illustrates local content represented by a primary local data stream 1610 and a secondary local data stream 1612 from a Local Headend 1608. Thus, the DRU 1500 has the capability to receive and aggregate local content converted to a digital data stream 1602 (for example, at the 700 MHz or the 800 MHz bands). If local content is present, for example, from a separate municipality, then the second ASP4b 1510 receives the data streams at SFP3 and SFP4 and passes the primary local data stream 1610 or switches to the secondary local data stream 1612 if loss of the primary local data stream 1612 is detected. A combiner 1508 sums the data streams provided by the main ASP4a 1502 and/or the local second ASP4b 1510 for production of aggregated data at the DRUs.

Figure 22:
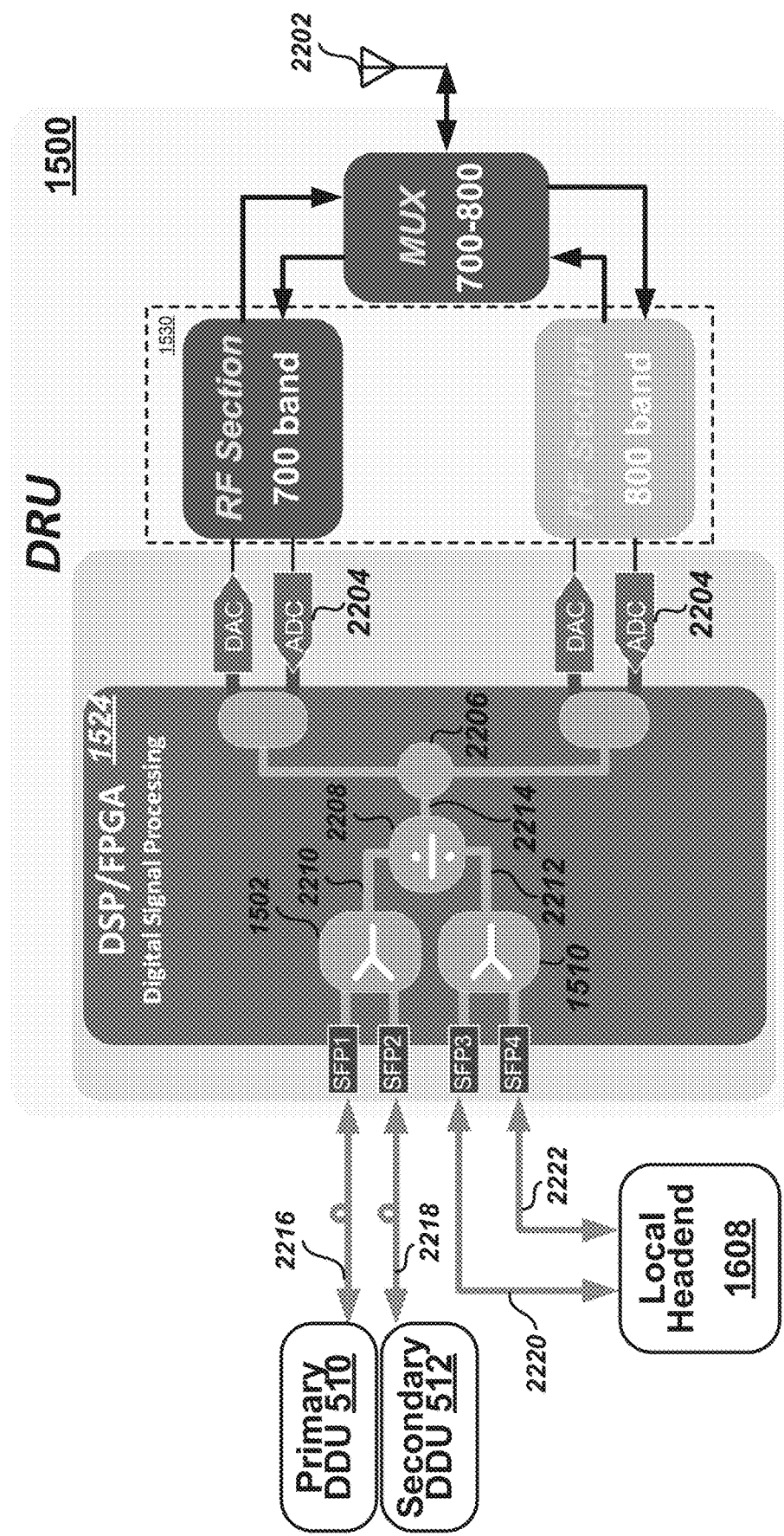
FIG. 22 is a block diagram illustrating uplink signal redundancy from a single DRU to a primary DDU, a secondary DDU and a local headend.

FIG. 22 is a block diagram illustrating DRU uplink signal redundancy to a primary DDU, a secondary DDU and a local headend. DRU 1500 receives RF signals from an antenna 2202. Signals are processed inside band/channel dedicated RF sections 1530, and then translated to baseband and transmitted to analog to digital converters (ADCs) 2204. The ADCs 2204 convert the baseband signals to an uplink digital data stream and are coupled to the DSP unit 1524. The DSP unit 1524 sums 2206 the uplink digital data streams coming from the ADCs 2204 coupled to the DSP Unit 1524. Next, the DSP Unit 1524 delivers the summed uplink digital data streams 2214 to a splitter 2208 that separates the summed uplink digital data streams into two signals, a first uplink digital data stream 2210 for the DDUs and a second uplink digital data stream 2212 for the local headend 1608. The first ASP4a 1502 splits the first uplink digital data stream 2210 for simultaneous transmission over the primary optical path 2216 to the primary DDU 510 and the secondary optical path 2218 to the secondary DDU 512. The Second ASP3b 1510 splits the second uplink digital data stream 2212 for simultaneous transmission over the primary optical path 2220 and the secondary optical path 2222 to the local headend 1608.

Figure 17:
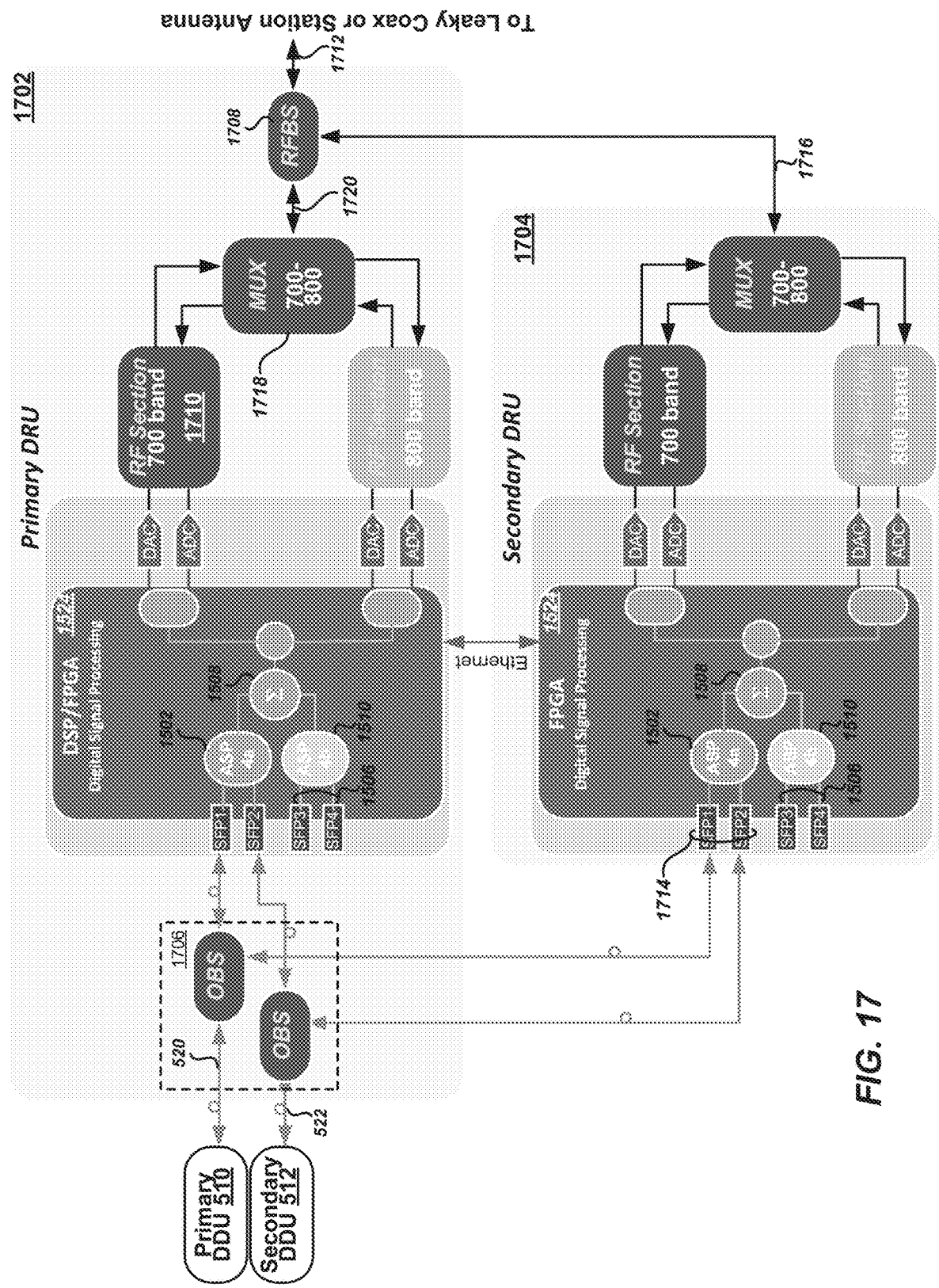
FIG. 17 is a block diagram illustrating redundancy utilizing multiple DRUs according to an embodiment of the present invention.

FIG. 17 is a block diagram illustrating redundancy utilizing multiple DRUs according to an embodiment of the present invention. As described below, a redundant DRU 1704 is implemented with integrated dual optical bypass switches 1706 and RF bypass switches 1708. In some implementations, the optical bypass switches may be replaced with optical splitters/combiners. As an alternative to substantially overlapping antenna coverage areas as illustrated in FIG. 7, the implementation illustrated in FIG. 17 provides redundant DRUs for applications in which the additional cost of the redundant DRU 1704 is justified by the additional backup protection provided by the use of the redundant DRU 1704. It should be noted that combinations of the architectures in FIGS. 7 and 17 can be implemented in which redundant DRUs are utilized in conjunction with overlapping antenna coverage areas. One of ordinary skill in the art would recognize many variations, modifications, and alternatives.

As illustrated in FIG. 17, the primary DRU 1702 receives the primary data stream 520 and the secondary data stream 522 from a primary DDU 510 and a second DDU 512. In default mode, the primary data stream 520 is processed through the DSP unit 1524 in the primary DRU 1702, converted to an RF signal in the RF section 1710 of the primary DRU 1702, and broadcast through leaky coaxial cable or a station antenna 1712. During normal operation, the secondary DRU 1704 is active, but does not receive the primary data stream 520 and the secondary data stream 522, which are delivered to the primary DRU 1702 by the optical bypass switches (OBSs) 1706. During normal operation, the primary DRU 1702 monitors the primary data stream 520 and the secondary data stream 522, operating using the primary data stream 520 as a default in some implementations. If the primary data stream 520 fails, then the primary DRU 1702 can switch to using the secondary data stream 522 as discussed in relation to ASP4a 1502 of the primary DRU 1702 as discussed in relation to FIGS. 15 and 16.

In the event that the primary DRU 1702 fails, the OBSs 1706 and the RF bypass switch (RFBS) 1708 will shift to the bypass position. The OBSs 1706 in this bypass position will switch to redirect and/or deliver the primary data stream 520 and the secondary data stream 522 to the secondary DRU 1704, which receives them at input ports 1714 coupled to the automatic selection point 4a (ASP4a) 1502 of the secondary DRU 1704. In the embodiment illustrated in FIG. 17, the OBSs 1706 are integrated into the primary DRU 1702 along with the RFBS 1708. The secondary DRU RF output 1716 is provided to RFBS 1708, which, in the bypass position, outputs the RF signal received from the secondary DRU 1704 rather than the primary DRU RF output 1720 from the multiplexer 1718 of the primary DRU 1702. As a result, the secondary DRU RF output 1716 is directed to leaky coaxial cable or a station antenna 1712 or other suitable broadcast equipment. Thus, in this mode of operation, the optical signals will be delivered to the input ports 1714 of the secondary DRU 1704 and the RF signal from the secondary DRU 1704 will be delivered to the leaky coaxial cable or station antenna 1712.

Figure 23:
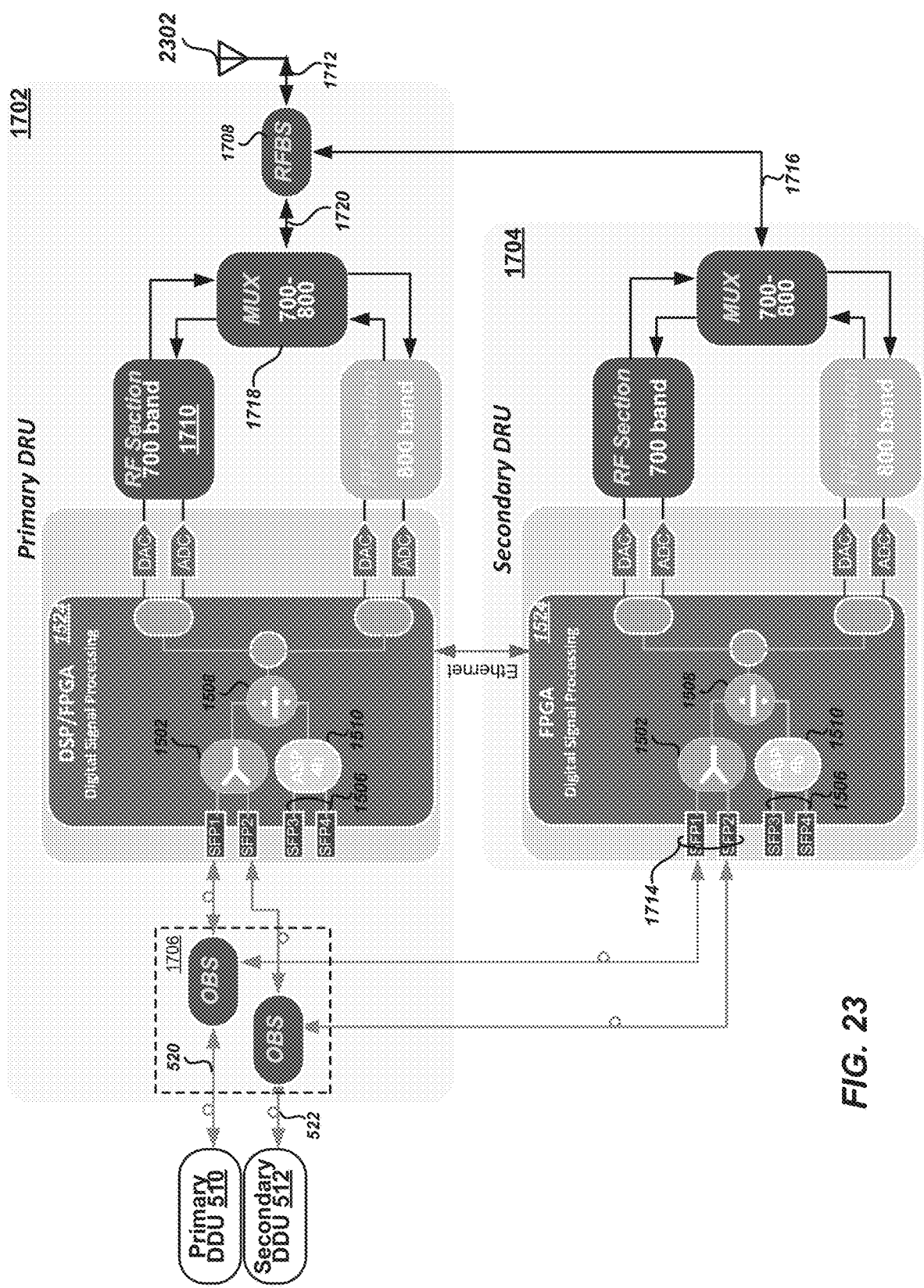
FIG. 23 is a block diagram illustrating uplink signal redundancy from dual redundant DRUs to a primary DDU and a secondary DDU.

FIG. 23 is a block diagram illustrating uplink signal redundancy from dual redundant DRUs to a primary DDU and a secondary DDU. Primary DRU 1702 receives RF signals from an antenna 2302. If the primary DRU 1702 is operational, the uplink signals are processed as discussed in relation to DRU 1500 in FIG. 22. If the primary DRU 1702 fails, RFBS 1708 and the OBSs 1706 will switch to the bypass position and the uplink signals will shift to the secondary DRU 1704.

Figure 18:
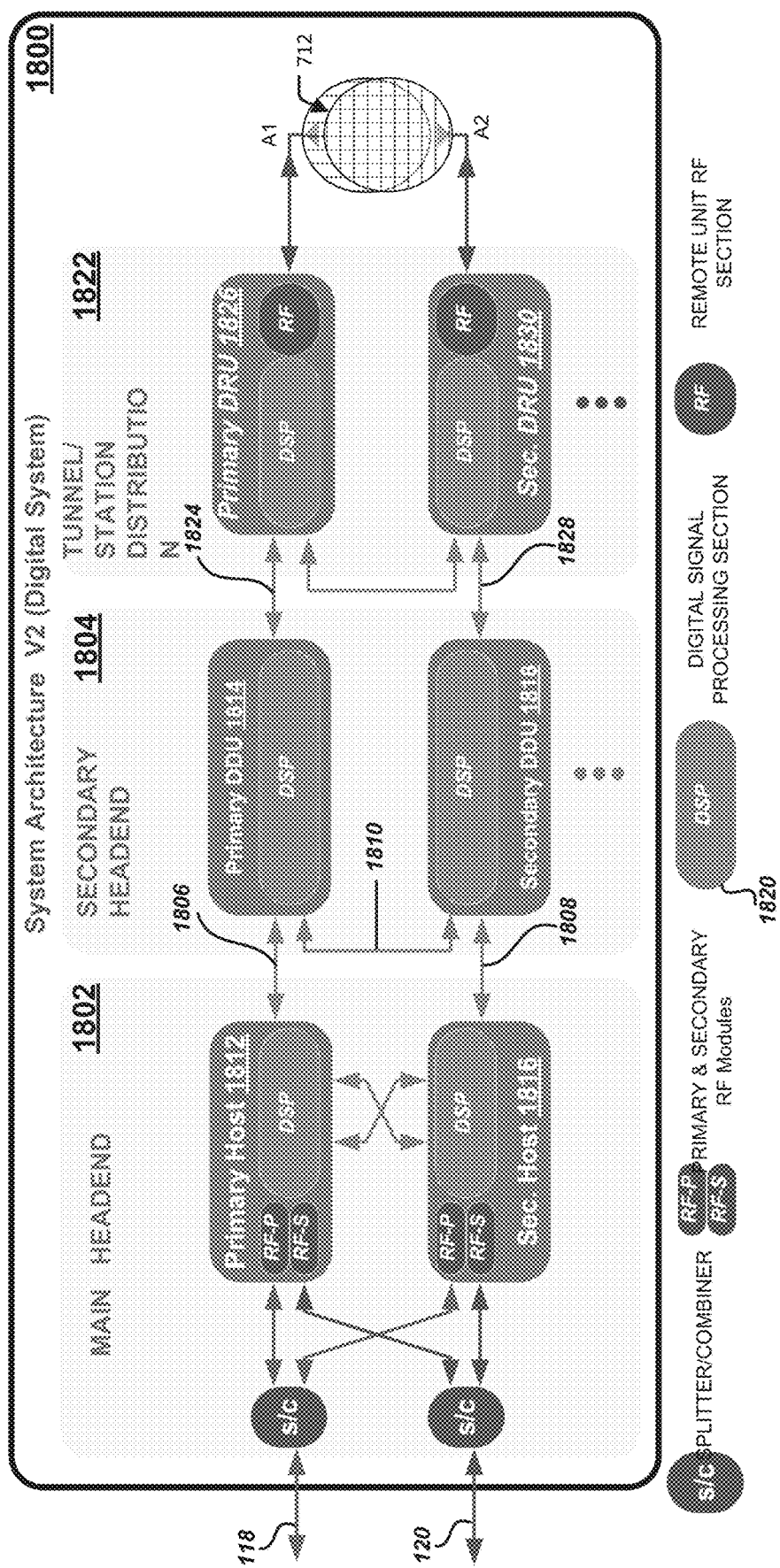
FIG. 18 is a simplified block diagram according to one embodiment of the invention showing the basic structure of a full redundancy Digital Public Safety Digital DAS architecture.

FIG. 18 is a simplified block diagram according to one embodiment of the invention showing the basic structure of a full redundancy Digital Public Safety Digital DAS architecture 1800. As illustrated in FIG. 18, the architecture 1800 shares some similarities with FIG. 7, the description of which is applicable to FIG. 18 as appropriate. The primary feed 118 and the secondary feed 120 are split between multiple hosts.

Fiber redundancy between the Main Headend 1802 and the Secondary Headend 1804 is provided by a first fiber connection 1806 between the primary host 1812 and the primary DDU 1814 as well as a second fiber connection 1808 between the secondary host 1816 and the secondary DDU 1818. For redundancy, a third fiber connection 1810 between the primary DDU 1814 and the secondary DDU 1818 is provided. In case of failure of the primary DDU 1814, the primary/secondary stream provided by the host units will be transmitted from the DSP block 1820 of the functioning DDU to the DSP block 1820 of the failed DDU.

In a similar manner, redundancy at the tunnel/station distribution 1822 is provided by a fourth fiber connection 1824 between the primary DDU 1814 and the primary DRU 1826, a fifth fiber connection 1828 between the secondary DDU 1818 and the secondary DRU 1830, and a fiber connection between the DSP block 1820 of the primary and secondary DRUs. In case of failure of one of the DRUs, the signal from the working DRU can be routed to the failed DRU for broadcast through the antenna of the failed DRU.

Figure 19:
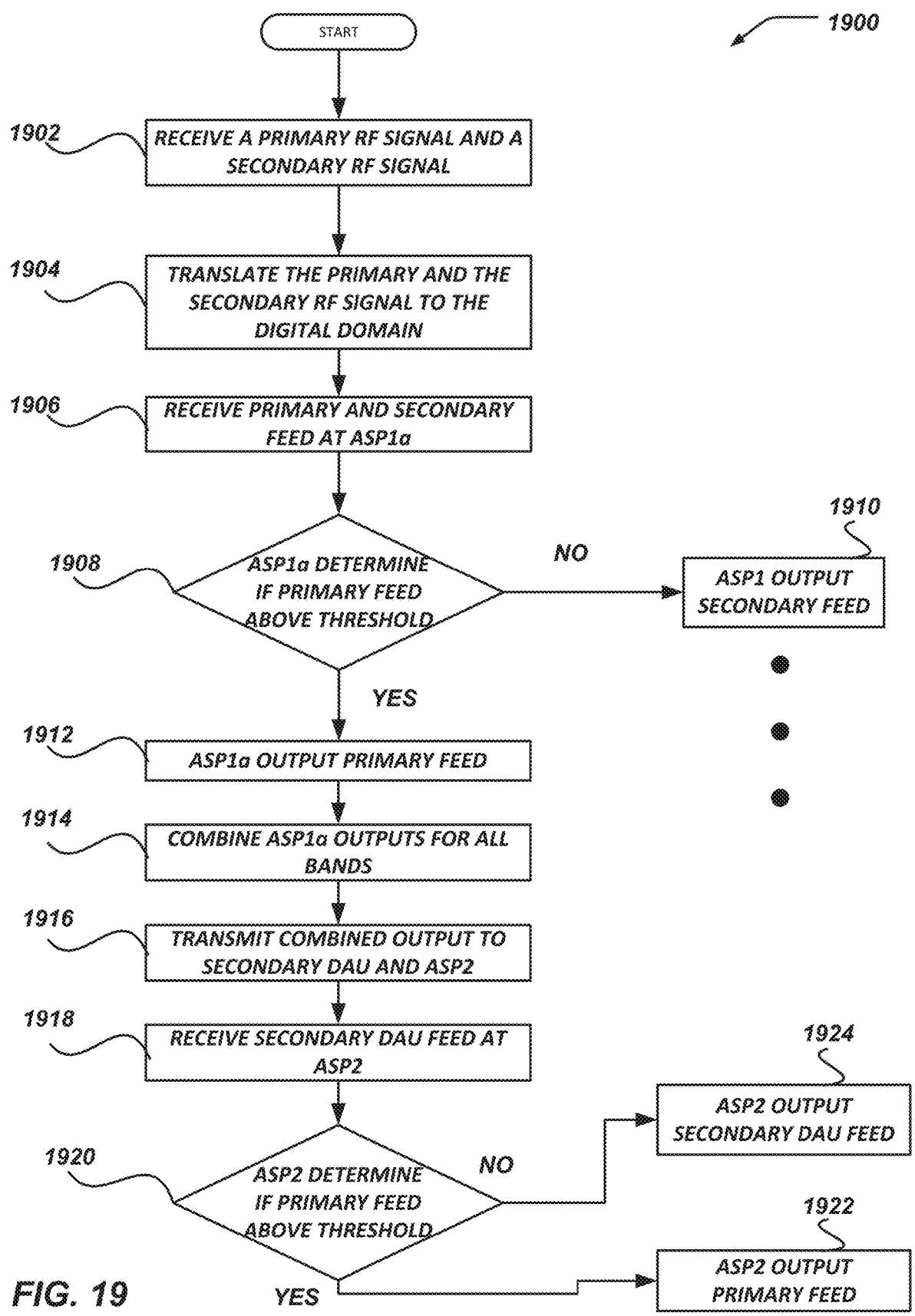
FIG. 19 is a simplified flowchart illustrating a method for selecting a primary or secondary feed according to an embodiment of the present invention.

FIG. 19 is a simplified flowchart illustrating a method for selecting a primary or secondary feed according to an embodiment of the present invention. As an example, the method can include processing RF signals at a DAU. First, the DAU receives a primary RF signal and a secondary RF signal (1902). The primary and secondary RF signals may be received from a local BTS or a remote BTS over a wired or wireless connection. In some implementations, the RF signal may be received over the air from a remote BTS. Next, the DAU will translate the primary and the secondary RF signals to the digital domain (1904). In some implementations, the DAU may use an FPGA to implement an ADC. In other implementations, the DAU may use a separate ADC to translate the primary and secondary RF signals to the digital domain. The DAU receives the primary RF signal as a digital primary feed and the secondary RF signal as a secondary digital feed at an automated selection point 1a (ASP1a) (1906).

In some implementations, ASP1a will output the primary feed by default. ASP1a will determine if the primary feed is above a threshold value (1908). The ASP1a can monitor digital signal characteristics or analyze the digitized RF signal to determine a threshold value. ASP1a outputs the primary feed if it is above the threshold value (1912). If the primary feed is below a threshold value, ASP1a will output the secondary feed (1910). Next, the output from ASP1*a* is combined with other frequency bands present at the DAU (1914).

The combined output can be transmitted to a secondary DAU and a second ASP, ASP2 (1916). The DAU receives a secondary DAU feed at ASP 2 (1918) and ASP2 determines if the primary feed is still above a threshold value (1920). If the primary feed is above a threshold value, ASP2 outputs the primary feed (1922) for transmission using an optical port. If ASP2 determines the primary is below a threshold value, ASP2 outputs the secondary DAU feed (1924) for transmission using an optical port.

It should be appreciated that the specific steps illustrated in FIG. 19 provide a particular method of selecting a primary or secondary feed according to an embodiment of the present invention. Other sequences of steps may also be performed according to alternative embodiments. For example, alternative embodiments of the present invention may perform the steps outlined above in a different order. Moreover, the individual steps illustrated in FIG. 19 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 25:
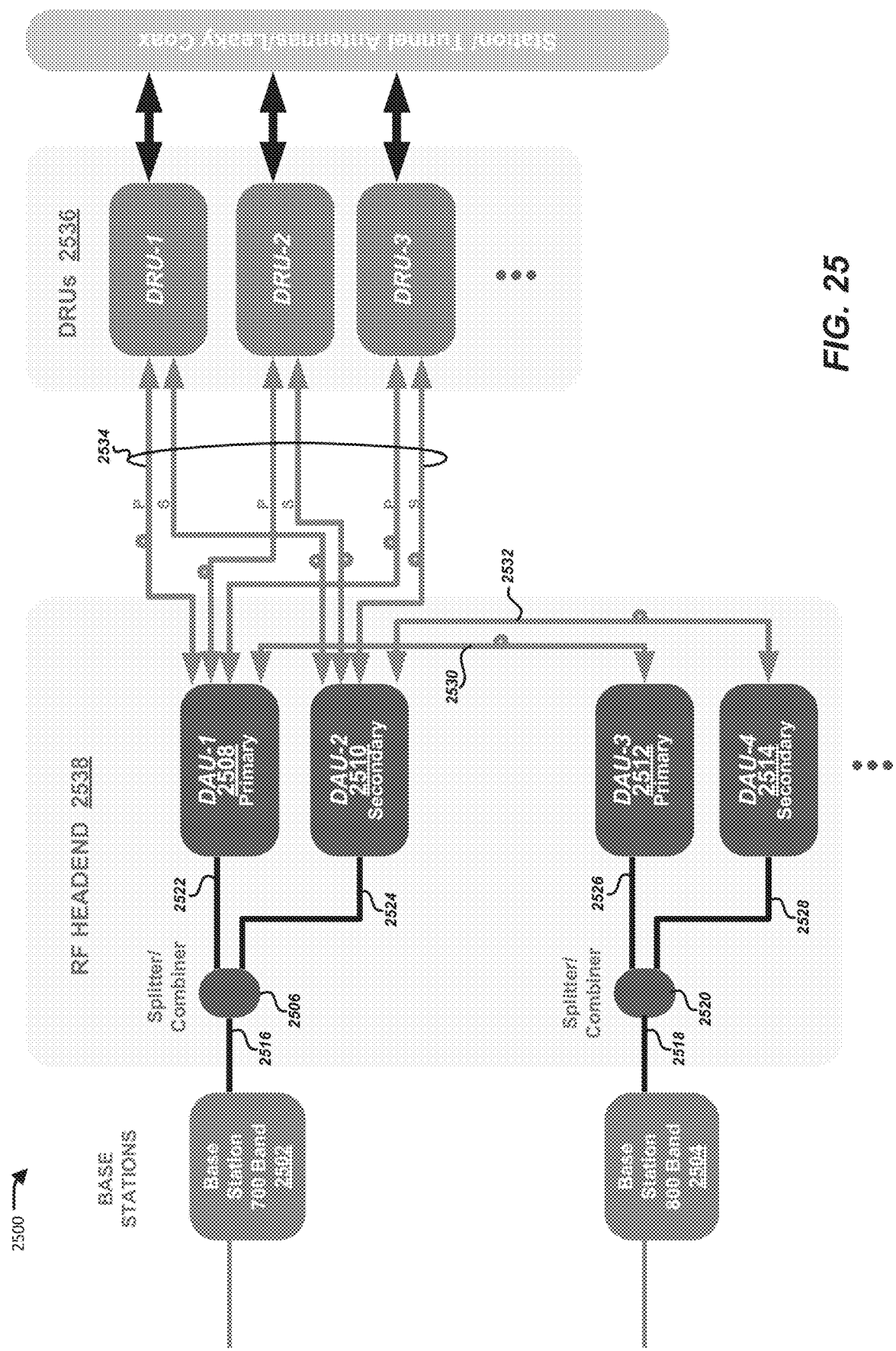
FIG. 25 is a block diagram according to one embodiment of the present invention showing the basic structure of a full redundancy digital DAS architecture.

FIG. 25 is a block diagram according to one embodiment of the present invention showing the basic structure of a full redundancy digital DAS architecture 2500. The architecture 2500 includes an RF Headend 2538 that is fed by a combination of a 700 MHz Band BTS 2502 and an 800 MHz Band BTS 2504. The 700 MHz Band BTS 2502 outputs a 700 MHz feed 2516 to a splitter/combiner 2506. The 800 MHz Band BTS 2504 outputs an 800 MHz feed 2518 to a second splitter/combiner 2520. The splitter/combiner elements create a primary feed and a secondary feed for each frequency and is coupled to four DAUs, a 700 MHz primary DAU 2508, a 700 MHz secondary DAU 2510, an 800 MHz primary DAU 2512, and an 800 MHz secondary DAU 2514.

The 700 MHz primary feed 2522 is received at an input port on the 700 MHz primary DAU 2508. As described above, the DAU creates a primary digital data stream that includes the 700 MHz primary feed 2522. The 700 MHz primary DAU 2508 also receives a primary digital data stream from the 800 MHz primary DAU 2512 over a first optical fiber connection 2530. The 700 MHz primary DAU 2508 combines the digital data streams as discussed above in FIG. 13 and transmits a primary digital data stream over optical fiber connections 2534 to a plurality of DRUs 2536. The 700 MHz secondary feed 2524 is received at an input port on the 700 MHz secondary DAU 2510. As described above, the DAU creates a secondary digital data stream that includes the 700 MHz secondary feed 2524. The 700 MHz secondary DAU 2510 also receives a secondary digital data stream from the 800 MHz secondary DAU 2514 over a second optical fiber connection 2532. The 700 MHz secondary DAU 2510 combines the digital data streams as discussed above in FIG. 13 and transmits a secondary digital data stream over optical fiber connections 2534 to the plurality of DRUs 2536.

It is also understood that the examples and embodiments described herein are for illustrative purposes only and that various modifications or changes in light thereof will be suggested to persons skilled in the art and are to be included within the spirit and purview of this application and scope of the appended claims.

Table 1 is a glossary of terms used herein, including acronyms.

TABLE 1

| Glossary of Terms | |
|---|---|
| ADC | Analog to Digital Converter |
| BTS | Base Transceiver Station |
| CDMA | Code Division Multiple Access |
| CWDM | Coarse Wave Division Multiplexing |
| DAU | Digital Access Unit |
| DDC | Digital Down Converter |
| DDU | Digital Distribution Unit |
| DNC | Down Converter |
| DRU | Digital Remote Unit |
| DSP | Digital Signal Processing |
| DUC | Digital Up Converter |
| DWDM | Dense Wave Division Multiplexing |
| FPGA | Field-Programmable Gate Array |
| PA | Power Amplifier |
| RF | Radio Frequency |
| RRH | Remote Radio Head |
| RRU | Remote Radio Head Unit |
| UMTS | Universal Mobile Telecommunications System |
| WCDMA | Wideband Code Division Multiple Access |
| WLAN | Wireless Local Area Network |

What is claimed is:

1. A redundancy system for data transport in a Distributed Antenna System (DAS), the redundancy system comprising:
   a plurality of Digital Access Units (DAUs), wherein each of the plurality of DAUs is fed by a plurality of data streams and is operable to transport digital signals between others of the plurality of DAUs;
   a plurality of Digital Distribution Units (DDUs), each of the plurality of DDUs being in communication with two or more of the plurality of DAUs using a first set of cross-connection communication paths;
   a plurality of Digital Remote Units (DRUs), each of the plurality of DRUs being in communication with two or more of the plurality of DDUs using a second set of cross-connection communications paths; and
   at least one digital signal processor (DSP) unit that:
      determines whether a signal quality for at least one data stream in the plurality of data streams is below a signal quality threshold, and
      in response to the determination, redirects one or more data streams in the plurality of data streams.

2. The redundancy system of claim 1, wherein at least one of the plurality of data streams comprises a radio frequency (RF) base transceiver station (BTS) signal.

3. The redundancy system of claim 1, the at least one DSP unit is operable to deliver a digital data signal to a second DSP unit included in a first DAU of the plurality of DAUs.

4. The redundancy system of claim 1, further comprising a second plurality of remote Digital Access Units (DAUs) located at a remote location, wherein one or more of the second plurality of remote DAUs are operable to receive a radio frequency (RF) input or a digital input from at least one of a plurality of Base Transceiver Stations (BTSs).

5. The redundancy system of claim 1, further comprising a plurality of transmit/receive cells, wherein one or more transmit/receive cells of the plurality of transmit/receive cells includes a subset of the plurality of DRUs.

6. The redundancy system of claim 1, wherein at least one of the first set or the second set of cross-connection communications paths uses an optical communications path.

7. A Distributed Antenna System (DAS) comprising:
   a primary integrated digital access unit (DAU) having a set of primary integrated input ports, a first primary integrated output port, and a second primary integrated output port;

a secondary integrated DAU having a set of secondary integrated input ports, a first secondary integrated output port, and a second secondary integrated output port;
a connection between the primary integrated DAU and the secondary integrated DAU;
a first digital distribution unit (DDU) having:
  a first DDU input port coupled to the first primary integrated output port
  a second DDU input port coupled to the first secondary integrated output port;
  a first DDU output port; and
  a second DDU output port;
a second DDU having:
  a third DDU input port coupled to the second primary integrated output port; and
  a fourth DDU input port coupled to the second secondary integrated output port;
  a third DDU output port; and
  a fourth DDU output port;
a first digital remote unit (DRU) having:
  a first DRU input port coupled to the first DDU output port;
  a second DRU input port coupled to the third DDU output port and
  a first DRU radio frequency (RF) output port;
a second digital remote unit having:
  a third DRU input port coupled to the second DDU output port;
  a fourth DRU input port coupled to the fourth DDU output port; and
  a second DRU RF output port; and
at least one digital signal processor (DSP) unit that:
  determines whether a signal quality for a first data stream in a plurality of data streams transported via the DAS is below a signal quality threshold; and
  in response to the determination, redirects a second data stream in the plurality of data streams.

8. The DAS of claim 7, further comprising:
a first antenna coupled to the first DRU RF output port; and
a second antenna coupled to the second DRU RF output port,
wherein a first coverage area associated with the first antenna substantially overlaps with a second coverage area associated with the second antenna.

9. The DAS of claim 7, wherein a primary feed received at the first DDU input port is associated with a base transceiver station (BTS).

10. The DAS of claim 9, wherein a secondary feed received at the second DDU input port is associated with a second BTS.

11. The DAS of claim 7, wherein a secondary feed received at the second DDU input port is associated with an off-air signal source.

12. The DAS of claim 7, wherein:
the primary integrated DAU further comprises a first digital signal processing (DSP) unit and
the second integrated DAU further comprises a second DSP unit, and
a digital connection between the primary integrated DAU and the secondary integrated DAU connects the first DSP unit and the second DSP unit.

13. The DAS of claim 7 wherein the primary integrated DAU and the secondary integrated DAU are located at single main headend location.

14. The DAS of claim 7 wherein:
a first input port in the set of primary integrated input ports and a first input port in the set of secondary integrated input ports are configured to receive a primary feed; and
a second input port in the set of primary integrated input ports and a second input port in the set of secondary integrated input ports are configured to receive a secondary feed.

15. The DAS of claim 7, wherein at least one of a first input port in the set of primary integrated input ports and at least a first input port in the set of the secondary integrated input ports are RF input ports.

16. The DAS of claim 7, wherein at least one of the first primary integrated output port, the second primary integrated output port, the first secondary integrated output port, the second primary integrated output port are digital optical output ports.

17. The DAS of claim 7 wherein the connection between the primary integrated DAU and the secondary integrated DAU is a digital connection.

* * * * *